(12) United States Patent
Chu et al.

(10) Patent No.: US 12,604,341 B2
(45) Date of Patent: Apr. 14, 2026

(54) METHOD AND APPARATUS FOR EXCHANGING FRAMES USING SECONDARY CHANNELS

(71) Applicant: NXP USA, Inc., Austin, TX (US)

(72) Inventors: Liwen Chu, San Ramon, CA (US); Rui Cao, Sunnyvale, CA (US); Hongyuan Zhang, Fremont, CA (US); Kiseon Ryu, McLean, VA (US); Huizhao Wang, San Jose, CA (US)

(73) Assignee: NXP USA, Inc., Austin, TX (US)

( * ) Notice: Subject to any disclaimer, the term of this patent is extended or adjusted under 35 U.S.C. 154(b) by 328 days.

(21) Appl. No.: 18/216,500

(22) Filed: Jun. 29, 2023

(65) Prior Publication Data

US 2024/0008082 A1     Jan. 4, 2024

Related U.S. Application Data

(60) Provisional application No. 63/367,310, filed on Jun. 29, 2022, provisional application No. 63/488,301, filed on Mar. 3, 2023.

(51) Int. Cl.
| | |
|---|---|
| *H04W 4/00* | (2018.01) |
| *H04W 48/12* | (2009.01) |
| *H04W 74/0816* | (2024.01) |

(52) U.S. Cl.
CPC ....... *H04W 74/0816* (2013.01); *H04W 48/12* (2013.01)

(58) Field of Classification Search
USPC ................................................. 370/329, 330
See application file for complete search history.

(56) References Cited

U.S. PATENT DOCUMENTS

| | | | |
|---|---|---|---|
| 11,457,448 B2 | 9/2022 | Chu et al. | |
| 2021/0168864 A1* | 6/2021 | Seok ................. | H04W 72/0446 |
| 2021/0266890 A1* | 8/2021 | Chu ...................... | H04W 72/51 |
| 2023/0232452 A1* | 7/2023 | Li ....................... | H04W 74/002 |
| | | | 370/329 |

(Continued)

OTHER PUBLICATIONS

Fischer, Matthew et al. "IEEE P802.11 Wireless LANs; LB200 Proposed Resolutions for SST element", IEEE 802.11-11/0602r0, May 10, 2014, 6 pgs.

(Continued)

*Primary Examiner* — Chuong T Ho

(57) ABSTRACT

A method and an apparatus for operating a Basic Service Set (BSS) are disclosed. A method involves announcing, by a first wireless device to a second wireless device, a BSS operating channel, wherein the first wireless device has at least one of a first transmission power capability and a first bandwidth capability, the second wireless device has at least one of a second transmission power capability that is less than the first transmission power capability and a second bandwidth capability that is narrower than the first bandwidth capability, and wherein the BSS operating channel is at least one of a punctured operating channel and an unpunctured operating channel, associating, by the second wireless device, with the first wireless device via the announcement of the BSS operating channel from the first wireless device, and exchanging frames between the first wireless device and the second wireless device in the BSS operating channel.

8 Claims, 16 Drawing Sheets

(56) References Cited

U.S. PATENT DOCUMENTS

| | | | | |
|---|---|---|---|---|
| 2023/0262785 A1* | 8/2023 | Li | ..................... | H04W 74/0866 |
| | | | | 370/329 |
| 2023/0319884 A1* | 10/2023 | Ko | ..................... | H04W 74/002 |
| | | | | 370/329 |
| 2024/0039773 A1* | 2/2024 | Lim | .................... | H04L 27/2602 |
| 2024/0097838 A1* | 3/2024 | Chu | ..................... | H04L 5/0037 |
| 2024/0163948 A1* | 5/2024 | Kim | ..................... | H04W 76/11 |
| 2025/0119191 A1* | 4/2025 | Lou | ..................... | H04B 7/0617 |

OTHER PUBLICATIONS

Seok, Yongho et al. "EHT SST Operation", IEEE 802.11-20/0736r2, Jul. 20, 2023, 9 pgs.
Kneckt, Jarkko et al. "MU-RTS to SST-STAs", IEEE 802.11-20/1583r1, Oct. 7, 2020, 18 pgs.
Lu, Kaiying et al. "IEEE P802.11 Wireless LANs; Proposed Draft Text for MLO: Soft AP MLD Operation", IEEE 802.11-20/1407r14, Feb. 20, 2021, 3 pgs.
IEEE, "IEEE P802.11ax™/D6.0", Draft Standard for Information technology—Telecommunications and information exchange between systems Local and metropolitan area networks Specific requirements, Nov. 2019, 780 pgs.

* cited by examiner

80MHZ CHANNEL 4 (SUBCHANNEL 4)

80MHZ CHANNEL 3 (SUBCHANNEL 3)

TB PPDU 802 (THROUGH SECONDARY CHANNEL BACKOFF)

BACKOFF 20MHZ CHANNEL 4

BACKOFF 20MHZ CHANNEL 3

BACKOFF 20MHZ CHANNEL 2

PRIMARY 20MHZ CHANNEL

BSS OPERATING CHANNEL 800

80MHZ CHANNEL 4 (SUBCHANNEL 4)

80MHZ CHANNEL 3 (SUBCHANNEL 3)

80MHZ CHANNEL 2 (SUBCHANNEL 2)

80MHZ CHANNEL 1 (SUBCHANNEL 1) (PRIMARY 80MHZ CHANNEL)

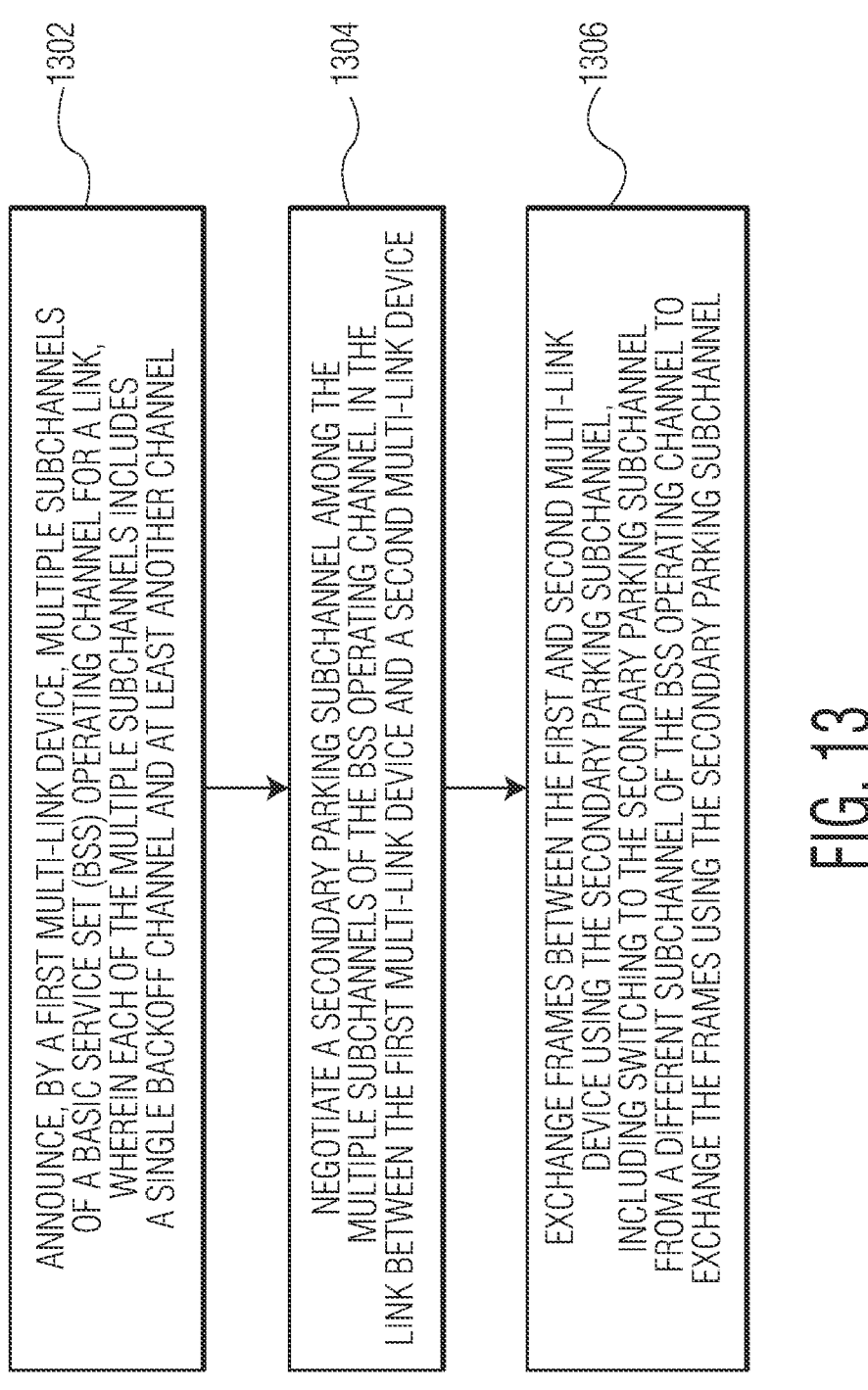

ANNOUNCE, BY A FIRST MULTI-LINK DEVICE, MULTIPLE SUBCHANNELS OF A BASIC SERVICE SET (BSS) OPERATING CHANNEL FOR A LINK, WHEREIN EACH OF THE MULTIPLE SUBCHANNELS INCLUDES A SINGLE BACKOFF CHANNEL AND AT LEAST ANOTHER CHANNEL — 1302

NEGOTIATE A SECONDARY PARKING SUBCHANNEL AMONG THE MULTIPLE SUBCHANNELS OF THE BSS OPERATING CHANNEL IN THE LINK BETWEEN THE FIRST MULTI-LINK DEVICE AND A SECOND MULTI-LINK DEVICE — 1304

EXCHANGE FRAMES BETWEEN THE FIRST AND SECOND MULTI-LINK DEVICE USING THE SECONDARY PARKING SUBCHANNEL, INCLUDING SWITCHING TO THE SECONDARY PARKING SUBCHANNEL FROM A DIFFERENT SUBCHANNEL OF THE BSS OPERATING CHANNEL TO EXCHANGE THE FRAMES USING THE SECONDARY PARKING SUBCHANNEL — 1306

FIG. 13

METHOD AND APPARATUS FOR EXCHANGING FRAMES USING SECONDARY CHANNELS

CROSS-REFERENCE TO RELATED APPLICATIONS

This application is entitled to the benefit of U.S. Provisional Patent Application Ser. No. 63/367,310, filed on Jun. 29, 2022, and U.S. Provisional Patent Application Ser. No. 63/488,301, filed on Mar. 3, 2023, each of which is incorporated by reference herein.

BACKGROUND

In wireless communications, wireless devices, e.g., access point (AP) multi-link devices (MLDs) or non-AP MLDs, e.g., station multi-link devices (STA MLDs), can execute various Basic Service Set (BSS) operations, such as announcements of some features or operations for channels in a multi-link BSS via one or more channels. As an example, a wireless AP MLD using the multi-link BSS may wirelessly transmit a Physical Layer Protocol Data Unit (PPDU) on each channel to transmit information of multiple channels and update BSS operating parameters. However, there is a need to more efficiently use the BSS operating channels to exchange frames between the different wireless devices.

SUMMARY

Embodiments of a method and an apparatus for performing frame exchanges between multi-link devices are disclosed. In an embodiment, a method for performing frame exchanges in a link between multi-link devices includes announcing, by a first multi-link device for the link, multiple subchannels of a basic service set (BSS) operating channel, wherein each of the multiple subchannels includes a single backoff channel and at least one another channel, negotiating a secondary parking subchannel among the multiple subchannels of the BSS operating channel in the link between the first multi-link device and a second multi-link device, and exchanging frames between the first and second multi-link devices using the secondary parking subchannel, including switching to the secondary parking subchannel from a different subchannel of the BSS operating channel to exchange the frames using the secondary parking subchannel.

In an embodiment, negotiating the secondary parking subchannel includes negotiating the secondary parking subchannel among the multiple subchannels of the BSS operating channel between the first multi-link device and a second multi-link device during a broadcast target wake time (TWT) membership negotiation.

In an embodiment, negotiating the secondary parking subchannel includes negotiating the secondary parking subchannel among the multiple subchannels of the BSS operating channel between the first multi-link device and a second multi-link device using a beacon transmitted through a duplicate Physical Layer Protocol Data Unit (PPDU), wherein at least one of the first and second multi-link devices can perform simultaneous backoff operations in more than one of the multiple subchannels.

In an embodiment, the method further comprises requesting, by the first multi-link device, the second multi-link device to switch to a subchannel of the multiple subchannels of the BSS operating channel other than the secondary parking subchannel during a transmission opportunity (TXOP) period.

In an embodiment, the method further comprises managing medium synchronization in a subchannel of the BSS operating channel after the medium synchronization is lost at the end of transmission opportunity (TXOP) period that does not cover the subchannel from the beginning to the end of the TXOP period.

In an embodiment, the method further comprises, when backoff counters in the multiple subchannels become zero at the same time in a device, using a backoff counter with the highest priority access category (AC) to initiate a transmission opportunity (TXOP) period.

In an embodiment, the backoff counter with the highest priority AC is in the primary channel when more than one backoff counters have the same highest priority AC.

In an embodiment, the method further comprises coding a Resource Unit (RU) index of a RU as an RU index per a bandwidth of the BSS operating channel or as an RU index per a bandwidth of a transmission opportunity (TXOP) period.

In an embodiment, the method further comprises, when a bandwidth (BW) of a transmission opportunity (TXOP) period covers multiple backoff channels, updating Enhanced Distribution Channel Access (EDCA) parameters of a particular backoff channel that initiated the TXOP period or the EDCA parameters of each of the multiple backoff channels with an Association Identifier (AID) that is same as an AID of a particular backoff channel that initiated the TXOP period.

In an embodiment, a device comprises a controller configured to announce multiple subchannels of a basic service set (BSS) operating channel, wherein each of the multiple subchannels includes a single backoff channel and at least one another channel, negotiate a secondary parking subchannel among the multiple subchannels of the BSS operating channel in a link between the device and another device, and exchange frames between the device and the another device using the secondary parking subchannel, including switching to the secondary parking subchannel from a different subchannel of the BSS operating channel to exchange the frames using the secondary parking subchannel.

In an embodiment, the controller is configured to negotiate the secondary parking subchannel among the multiple subchannels of the BSS operating channel in the link between the device and the another device during a broadcast target wake time (TWT) membership negotiation.

In an embodiment, the controller is configured to negotiate the secondary parking subchannel among the multiple subchannels of the BSS operating channel in the link between the device and the another device using a beacon transmitted through a duplicate Physical Layer Protocol Data Unit (PPDU), wherein at least one of the first and second multi-link devices can perform simultaneous backoff operations in more than one of the multiple subchannels.

In an embodiment, the controller is configured to request the another device to switch to a subchannel of the multiple subchannels of the BSS operating channel other than the secondary parking subchannel during a transmission opportunity (TXOP) period.

In an embodiment, the controller is configured to manage medium synchronization in a subchannel of the BSS operating channel after the medium synchronization is lost at the end of a transmission opportunity (TXOP) period that does not cover the subchannel from the beginning to the end of the TXOP period.

In an embodiment, the controller is configured to, when backoff counters in the multiple subchannels become zero at the same time, using a backoff counter with the highest priority access category (AC) to initiate a transmission opportunity (TXOP) period.

In an embodiment, the backoff counter with the highest priority AC is in the primary channel when more than one backoff counters have the same highest priority AC.

In an embodiment, the controller is configured to code a Resource Unit (RU) index of a RU as an RU index per a bandwidth of the BSS operating channel or as an RU index per a bandwidth of a transmission opportunity (TXOP) period.

In an embodiment, the controller is configured to, when a bandwidth (BW) of a transmission opportunity (TXOP) period covers multiple backoff channels, update Enhanced Distribution Channel Access (EDCA) parameters of a particular backoff channel that initiated the TXOP period or the EDCA parameters of each of the multiple backoff channels with an Association Identifier (AID) that is same as an AID of a particular backoff channel that initiated the TXOP period.

In an embodiment, a device comprises a controller configured to announce multiple subchannels of a basic service set (BSS) operating channel, wherein each of the multiple subchannels includes a single backoff 20 megahertz (MHz) channel and at least one another 20 MHz channel, negotiate a secondary parking 20 MHz subchannel among the multiple subchannels of the BSS operating channel in a link between the device and another device, and exchange frames between the device and the another device using the secondary parking 20 MHz subchannel, including switching to the secondary parking 20 MHz subchannel from a different 20 MHz subchannel of the BSS operating channel to exchange the frames using the secondary parking 20 MHz subchannel.

In an embodiment, the controller is configured to request the another device to switch to a 20 MHz subchannel of the multiple subchannels of the BSS operating channel other than the secondary parking 20 MHz subchannel during a transmission opportunity (TXOP) period.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 13 shows a flow diagram of a method for performing frame exchanges between multi-link devices in accordance with an embodiment of the invention.

Throughout the description, similar reference numbers may be used to identify similar elements.

DETAILED DESCRIPTION

Figure 1:
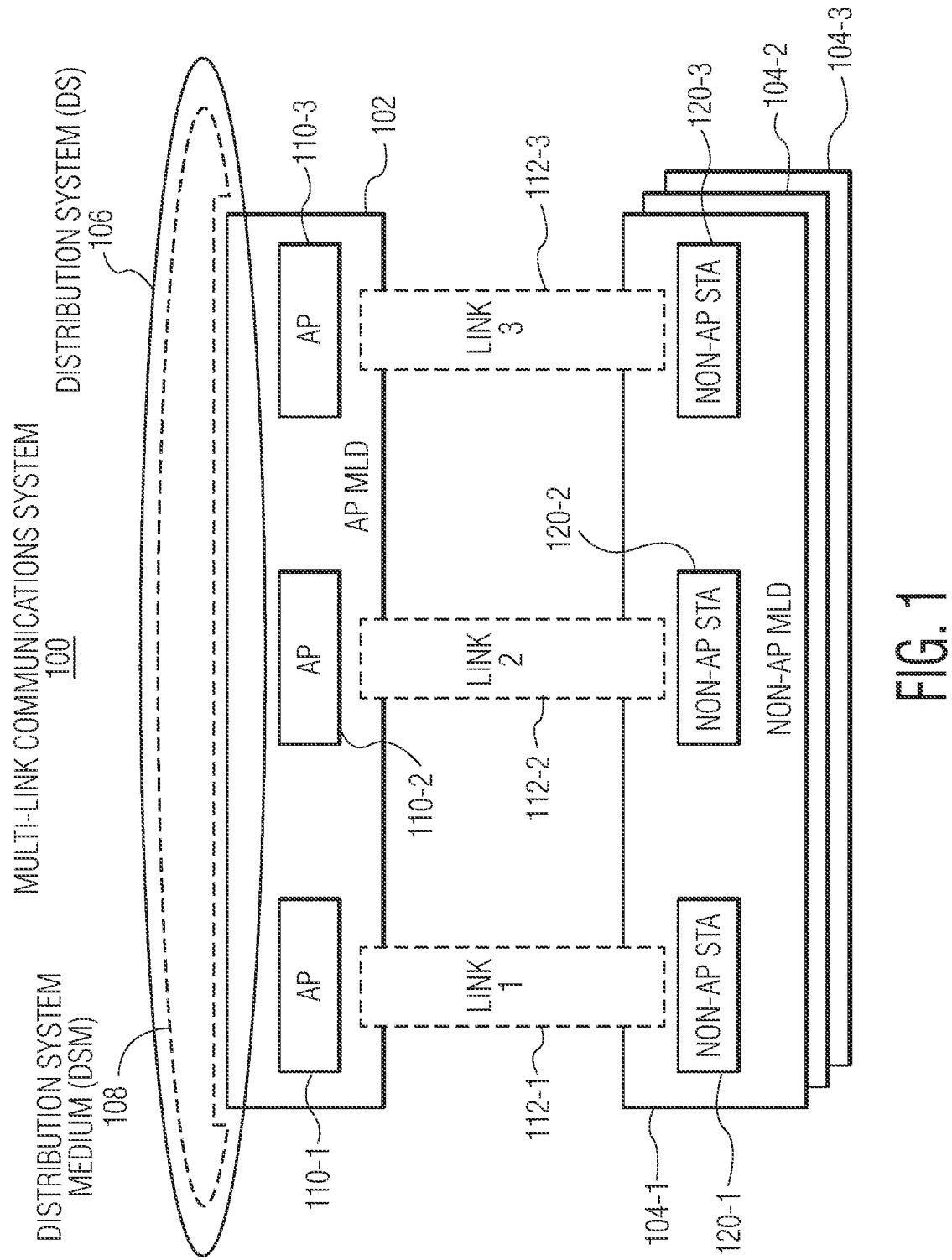
FIG. 1 shows a multi-link communications system in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless device, e.g., an access point (AP) multi-link device (MLD) of a wireless local area network (WLAN) transmits data to at least one associated station (STA) MLD. The AP MLD is configured to operate with associated STA MLDs according to a communication protocol. For example, the communication protocol may be a next generation of Extremely High Throughput (EHT) communication protocol, or next generation of Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP, but are generally affiliated with lower data throughput protocols. The lower data throughput communication protocols (e.g., IEEE 802.11n, IEEE 802.11ac, IEEE 802.11ax, IEEE 802.11be, etc.) may be collectively referred to herein as "legacy" communication protocols.

FIG. 1 depicts a multi-link communications system 100 in accordance with an embodiment of the invention. In the embodiment depicted in FIG. 1, the multi-link communications system includes at least one AP MLD 102, and multiple non-AP MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In some embodiments, the multi-link communications system includes one or more AP MLDs and/or one or more non-AP MLDs. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system includes multiple AP MLDs, more than three non-AP MLDs, and/or less than three non-AP MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3. The APs 110-1, 110-2, 110-3 may be implemented in hardware (e.g., circuits), software, firmware, or a combination thereof. The APs 110-1, 110-2, 110-3 may be fully or partially implemented as an integrated circuit (IC) device. In some embodiments, the APs 110-1, 110-2, 110-3 are wireless APs compatible with at least one WLAN communications protocol (e.g., at least one IEEE 802.11 protocol). For example, the APs 110-1, 110-2, 110-3 may be wireless APs compatible with an IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different size BSS operating channel. For example, AP1 106-1 may operate in a 320 megahertz (MHz) BSS operating channel and AP2 106-2 may operate in a 160 MHz BSS operating channel. In some of the embodiments, each of the APs 106-1 or 106-2 of the AP MLD 104 may separate the 320 MHz BSS operating channel or the 160 MHz BSS operating channel into multiple subchannels. For example, AP1 106-1 may separate the 320 MHz BSS operating channel into four 80 MHz subchannels and AP2 106-2 may separate the 160 MHz BSS operating channel into two 80 MHz subchannels. Examples of channels within the 80 MHz subchannels may include a 20 MHz channel of a BSS and a 40 MHz channel of the BSS. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the non-AP MLD 104-1 includes multiple non-AP stations (STAs) 120-1, 120-2, 120-3. The STAs 120-1, 120-2, 120-3 may be implemented in hardware (e.g., circuits), software, firmware, or a combination thereof. The STAs 120-1, 120-2, 120-3 may be fully or partially implemented as an IC device. In some embodiments, the non-AP STAs 120-1, 120-2, 120-3 are wireless devices that wirelessly connect to wireless APs. For example, at least one of the non-AP STAs 120-1, 120-2, 120-3 may be a laptop, a desktop personal computer (PC), a mobile phone, or other wireless device that supports at least one WLAN communications protocol. In some embodiments, the non-AP STAs 120-1, 120-2, 120-3 are wireless devices compatible with at least one IEEE 802.11 protocol (e.g., an IEEE 802.11be protocol). In some embodiments, the non-AP MLD has one Media Access Control (MAC) data service interface. In an embodiment, a single address is associated with the MAC data service interface and is used to communicate on the DSM 108. In some embodiments, the AP MLD 102 and/or the non-AP MLDs 104-1, 104-2, 104-3 identify which communications links support the multi-link operation during a multi-link operation setup phase and/or exchanges information regarding multi-link capabilities during the multi-link operation setup phase. Each of the non-AP STAs 120-1, 120-2, 120-3 of the non-AP MLD may operate in a different frequency band. For example, the non-AP STA 120-1 may operate in 2.4 GHz frequency band, the non-AP STA 120-2 may operate in 5 GHz frequency band, and the non-AP STA 120-3 may operate in 6 GHz frequency band. Each of the non-AP MLDs 104-2, 104-3 may be the same as or similar to the non-AP MLD 104-1. For example, the non-AP MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a physical (PHY) device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the non-AP MLD 104-1, 104-2, or 104-3 communicates with the AP MLD 102 through multiple communications links 112-1, 112-2, 112-3. For example, each of the non-AP STAs 120-1, 120-2, 120-3 communicates with an AP 110-1, 110-2, or 110-3 through a corresponding communications link 112-1, 112-2, or 112-3. Although the non-AP MLD 104-1 is shown in FIG. 1 as including three non-AP STAs, other embodiments of the non-AP MLD 104-1 may include fewer than three non-AP STAs or more than three non-AP STAs. In addition, although the AP MLD 102 communicates (e.g., wirelessly communicates) with the non-AP MLDs 104-1, 104-2, 104-3 through multiple links 112-1, 112-2, 112-3, in other embodiments, the AP MLD 102 may communicate (e.g., wirelessly communicates) with the non-AP MLDs through more than three communications links or less three than communications links.

The EHT communication protocol (i.e., IEEE 802.11be standard) is a next version of the communications protocol that will succeed the IEEE High Efficiency (HE) 802.11ax standard. Additional future versions (e.g., next-generation communication protocols) of the IEEE 802.11be communication protocol may succeed IEEE 802.11ax or IEEE 802.11be. It is desirable that future versions of the communication protocol provide backward compatibility and support interoperability with legacy versions of the IEEE 802.11 communication protocol. However, wireless devices operating according to a legacy communication protocol may be limited to utilizing a narrower bandwidth (e.g., less than 320 MHz) or less transmission power than wireless devices operating according to non-legacy communication protocols. In some embodiments, non-AP MLDs may only support a narrower bandwidth or less transmission power than an associated AP MLD. In some embodiments, the EHT communication protocol permits a wireless device (e.g., an AP) in a BSS to establish a BSS operating channel through a BSS operation element that includes multiple 20 MHz channels aggregated together to form one or more subchannels (which may referred to as a "segment" or "channel segment"). Each of these subchannels may include a single backoff 20 MHz channel, which may be used for a backoff operation or procedure.

Figure 2:
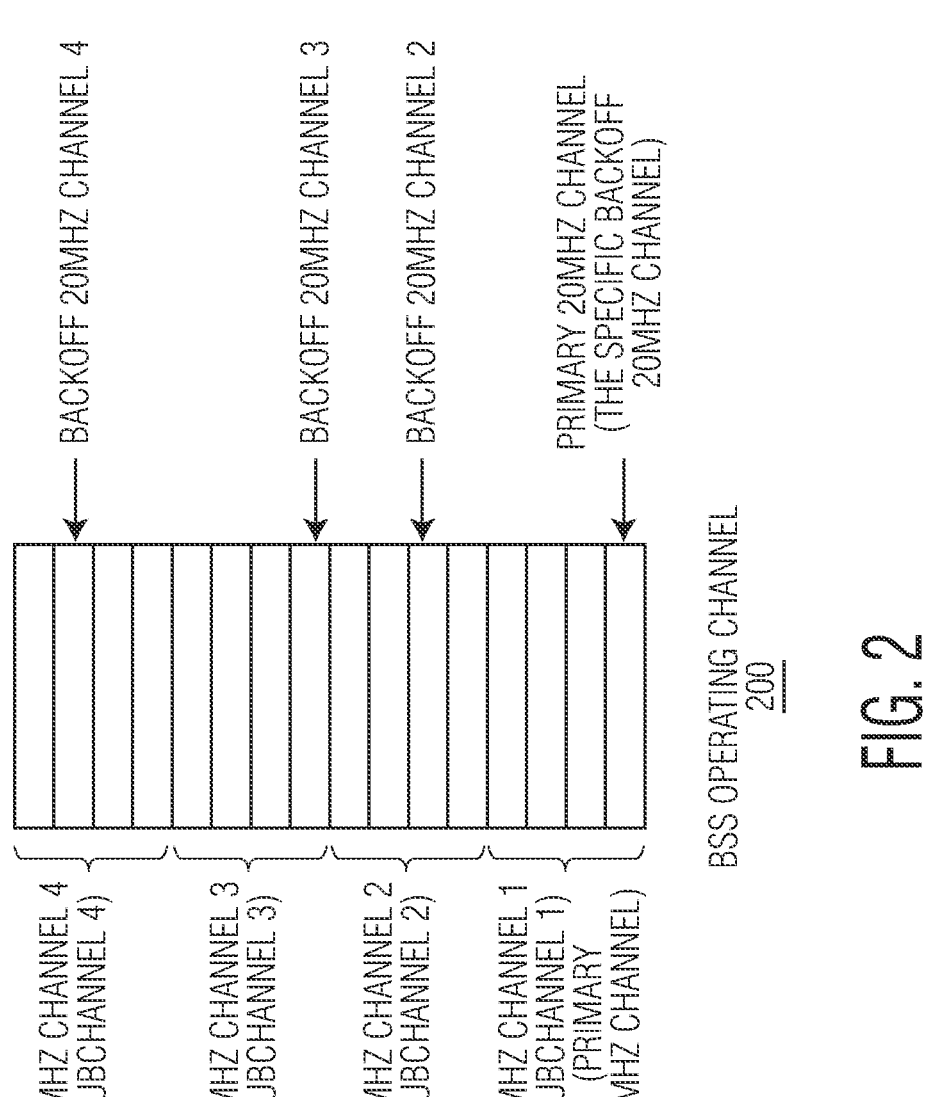
FIG. 2 shows an example of a Basic Service Set (BSS) operating channel in accordance with an embodiment of the invention.

FIG. 2 shows an example of a BSS operating channel 200 in accordance with an embodiment of the invention. The BSS operating channel 200, which may be announced by an AP in the multi-link communications system 100, includes four (4) subchannels, which are 80 MHz channel 1, 80 MHz channel 2, 80 MHz channel 3 and 80 MHz channel 4. The 80 MHz channel 1 includes the primary 20 MHz channel for the BSS operating channel. Each of these 80 MHz channels includes four (4) 20 MHz channels where one of the four channels is a backoff 20 MHz channel. The backoff 20 MHz channels of the subchannels 1-4 are indicated in FIG. 2 as backoff 20 MHz channels 1-4, respectively. The backoff channel for the subchannel 1 is the primary 20 MHz channel of the BSS operating channel 200.

In an embodiment, an AP can announce the multiple subchannels of its operating channel where each subchannel includes multiple 20 MHz channels and where each subchannel has one backoff 20 MHz channel. These backoff channels of the subchannels cannot be punctured in dynamic channel puncture operations, which are operations transmitted in punctured portions of BSS operating channels.

In an embodiment, a STA or AP (STA/AP) can announce one or more Physical Layer Protocol Data Unit (PPDU) detection capabilities. One capability that can be announced is detecting PPDU through one backoff 20 MHz channel in the BSS operating channel Another capability that can be announced is detecting PPDU through multiple backoff 20 MHz channels in the BSS operating channel.

In an embodiment, a STA/AP can announce one or more backoff procedure capabilities. One capability that can be announced is that a backoff procedure (sometimes referred to herein simply as "backoff") is performed in one backoff 20 MHz channel. Another capability that can be announced is that backoff is simultaneously performed in multiple backoff 20 MHz channels where each backoff channel is in one of the subchannels of the BSS operating channel. Another capability that can be announced is that only one of the multiple backoff channels where each backoff channel is in one subchannel of the BSS operating channel, can be used for backoff at any time.

In an embodiment, a STA/AP can enable one or more backoff procedures. One backoff procedure that can be enabled is that backoff is performed in one backoff 20 MHz channel One special case for this backoff procedure is to perform backoff in the primary backoff 20 MHz channel only. Another backoff procedure that can be enabled is that backoff is performed in multiple backoff 20 MHz channels. For this backoff procedure, backoff may be simultaneously performed in multiple backoff 20 MHz channels where each backoff channel is in one of the subchannels of the BSS operating channel. Alternatively, for this backoff procedure, only one of the multiple backoff 20 MHz channels, where each backoff channel is in one subchannel of the BSS operating channel, can be used for backoff at any time. In an embodiment, if the primary 20 MHz channel is busy because of the neighbor BSS's TXOP, the AP/STA switches to one of the other backoff channels to do the backoff. The frame exchanges in the subchannel(s) other than the subchannel with the primary channel are done no later than the end of the TXOP that uses the primary channel. In another embodiment, the priorities is given to the various subchannels other than the subchannel with the primary 20 MHz channel, so that the AP/STA will switch to the same subchannel for the frame exchanges when the subchannel(s) having higher priority is busy. In another embodiment, two subchannels in a BSS are defined.

In an embodiment, the multi-link communications system 100 is configured to enable secondary subchannel parking in each link or in part of its links. As used herein, when STA and/or AP are "parked" in a (sub)channel, it means that the STA and/or the AP operate on the (sub)channel and remain on the (sub)channel permanently or for a specified period of time, e.g., Target Wake Time (TWT) service period (SP). In this embodiment for TWT SP, the selective subchannel transmission (SST) is used for STAs to park in different subchannels and is extended to the broadcast Target Wake Time (TWT) agreement. During the broadcast TWT membership negotiation, a STA can negotiate the secondary subchannel parking with an AP. Once the parked secondary subchannel and the related broadcast TWT membership are successfully negotiated, the STA can switch to the negotiated subchannel at the beginning of the negotiated broadcast TWT service period (SP) and stay in the subchannel until the end of the TWT SP. As an example, the SST is extended to 320 MHZ BSS. In an individual/broadcast TWT SP, in one embodiment, the AP can use any backoff 20 MHz channel to do backoff. In another embodiment, when the subchannel with the primary 20 MHz channel is busy because of the neighbor BSS's TXOP, the AP uses a backoff channel other than the primary 20 MHz channel to do backoff for the frame exchanges until the end of the neighbor BSS's TXOP at the primary 20 MHz channel.

Figure 3:
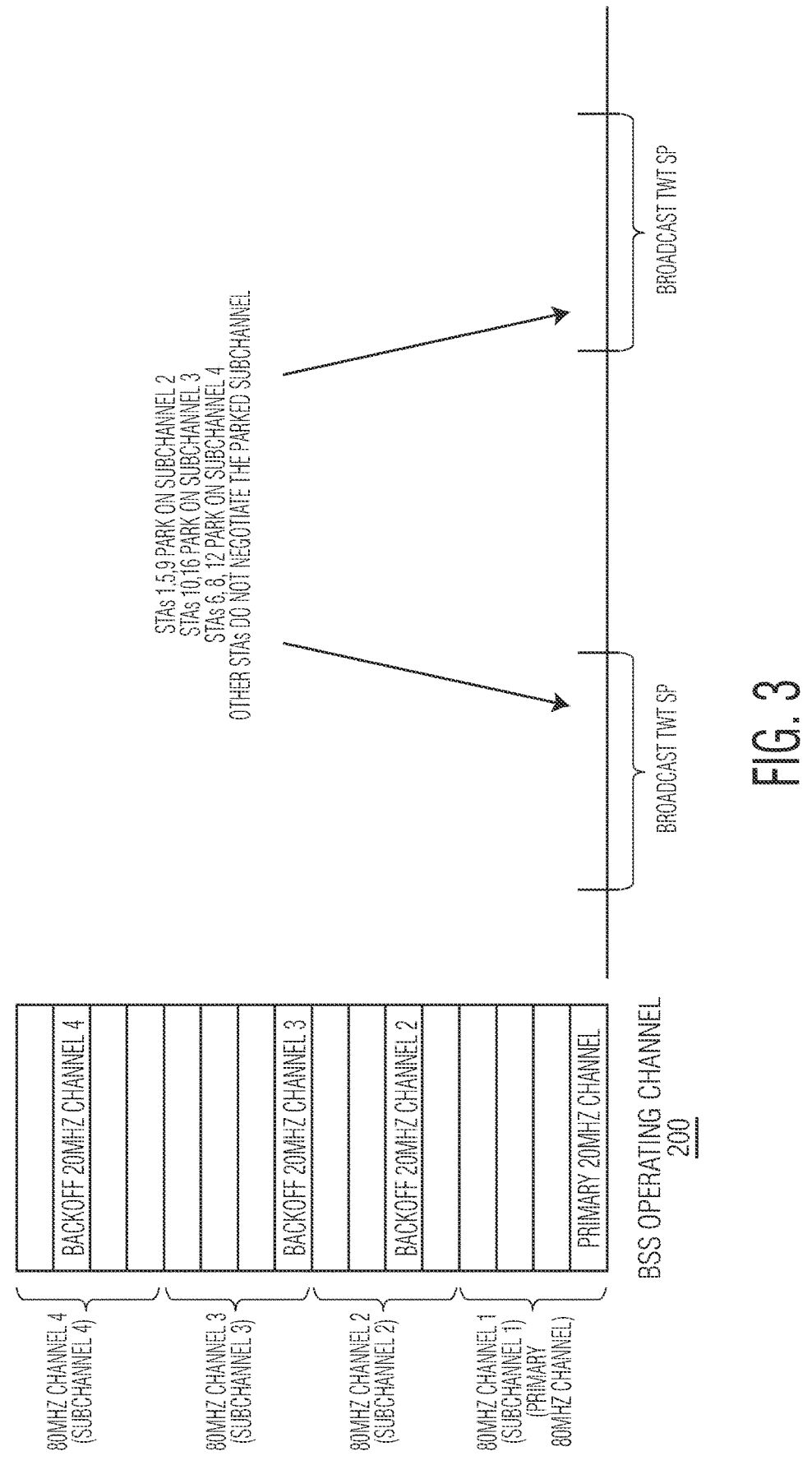
FIG. 3 illustrates an example of using the secondary subchannel parking feature of the multi-link communications system shown in FIG. 1 in accordance with an embodiment of the invention.

FIG. 3 illustrates an example of using the secondary subchannel parking feature of the multi-link communications system 100 in a link in accordance with an embodiment of the invention. In this example, some STAs are parked on particular subchannels other than the subchannel with primary 20 MHz channel through the negotiation, while other STAs did not negotiate the parking particular subchannels other than the subchannel with the primary 20 MHz channel Specifically, STAs 1, 5 and 9 are parked on subchannel 2, STAs 10 and 16 are parked on subchannel 3, and STAs 6, 8 and 12 are parked on subchannel 3. The other STAs did not negotiate the particular parking subchannels other than the subchannel with primary 20 MHz channel, i.e., these other STAs park in the subchannel with the primary 20 MHz channel Thus, as illustrated in FIG. 3, during broadcast TWT SPs, STAs 1, 5, 6, 8, 9, 10, 12 and 16 are parked on their respective subchannels that do not cover the primary 20 MHz channel. However, the other STAs park in the subchannel with the primary 20 MHz channel during the TWT SPs.

In an embodiment, when an AP can perform simultaneous backoff in all subchannels of the BSS operating channel where each subchannel has one backoff 20 MHz channel, a STA and an AP can negotiate the parked subchannel without depending on TWT. In this embodiment, the STA switches back to the subchannel with primary 20 MHz channel (primary subchannel 1) at Target Beacon Transmission Time (TBTT) for beacon reception. If the AP transmits the beacon through duplicate PPDU, the STA does not need to switch back to receive the beacon. Such negotiation can be used by a STA whose bandwidth (BW) is wider than the BW of a subchannel, which means that the STA starts the PPDU decoding from the subchannel.

In an embodiment, the multi-link communications system 100 is configured to enable multiple channel backoff/access for APs. Even when no associated STAs support secondary channel backoff, an AP with secondary channel backoff/ access can enable the backoff/access in multiple subchannels with STAs parked in different subchannels. In this case, the different STAs can detect PPDU through multiple subchannels simultaneously. The AP can have the capability of simultaneous backoff in multiple backoff 20 MH channels and/or have the capability of announcing multiple 20 MHz backoff channels, where the AP can perform the backoff in one backoff 20 MHz channel at any time. When the AP has the capability of simultaneous backoff in multiple backoff 20 MH channels and has the capability of announcing multiple 20 MHz backoff channels where the AP can perform backoff in one backoff 20 MHz channel at any time, the AP can enable one of the following backoff operating modes: (1) simultaneous backoff in multiple backoff 20 MH channel, and (2) backoff in one backoff channel at any time, after announcing multiple 20 MHz backoff channels.

In an embodiment, the multi-link communications system 100 is configured to enable per transmit opportunity (TXOP) channel switch (dynamic channel switch). In one embodiment, in a TWT SP where a STA and an AP negotiate a secondary parking subchannel, the AP that has TXOP BW wider than a subchannel through the backoff of the primary subchannel or one of the other subchannels can dynamically ask the STA to switch from its parking subchannel to another subchannel for the frame exchange at the beginning of a TXOP period through a control frame, such as a multi-user RTS (MU-RTS) frame or a Beamforming Report Poll (BSRP) Trigger frame. In one embodiment, the STA can switch back to the parking subchannel after the end of the TXOP period. This dynamic channel switch process in accordance with an embodiment of the invention is illustrated in FIG. 4 with respect to a TXOP period.

Figure 4:
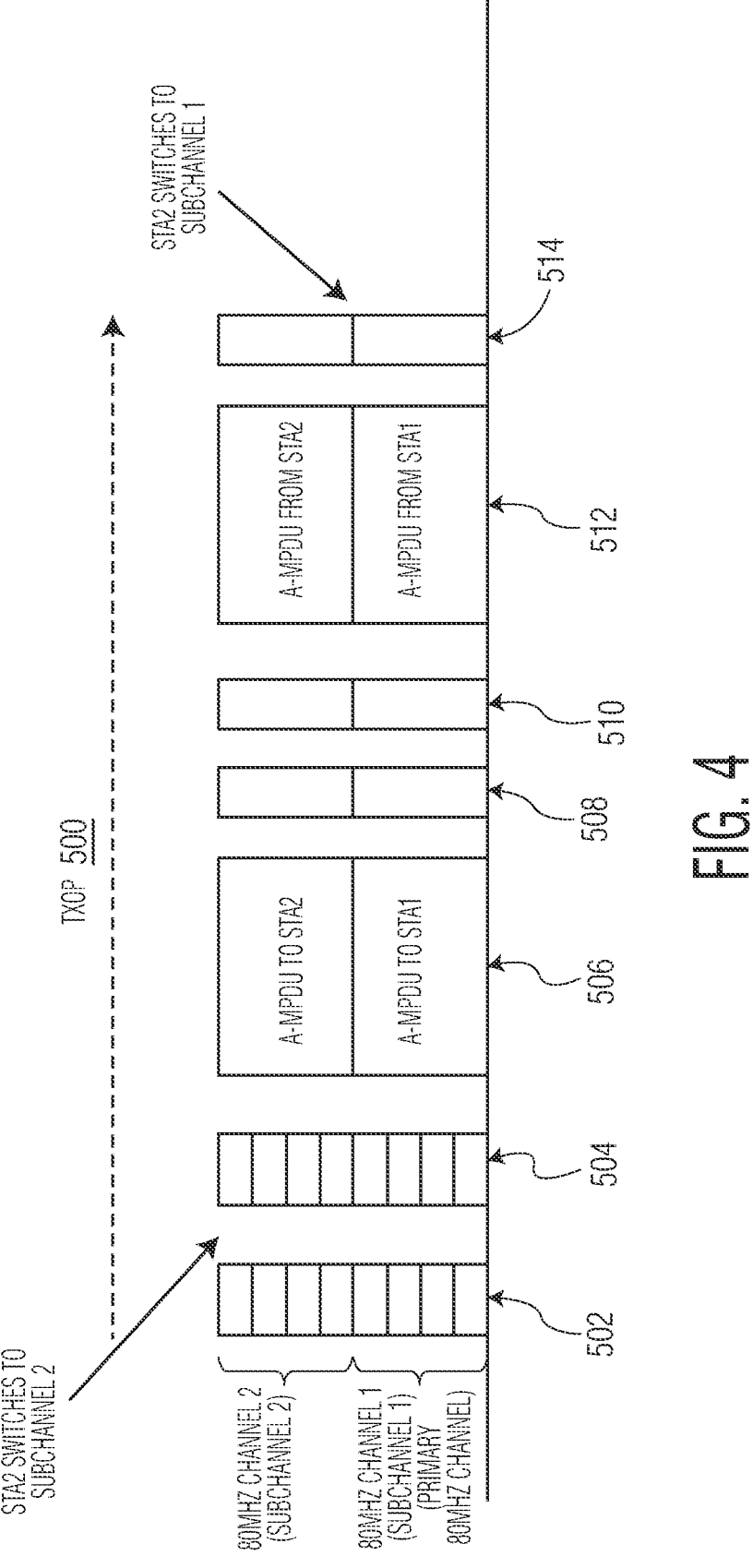
FIG. 4 illustrates a dynamic channel switch process with respect to a transmission opportunity (TXOP) period in accordance with an embodiment of the invention.

As shown in FIG. 4, frame exchange is executed between an AP and STA 2 during a 160 MHz TXOP period 500 through the backoff of a primary subchannel, i.e., the subchannel 1. STA1 and STA2 are parked at the primary subchannel. The frame exchange involves transmissions of a multi-user RTS (MU-RTS) frame 502 to STAs 1 and 2, a Clear-to-Send (CTS) frame 504 from STA 1 and STA 2, a downlink (DL) multi-user (MU) PPDU (DL MU PPDU) 506 to STAs 1 and 2 (A-MPDUs to STAs 1 and 2), an uplink (UL) trigger-based (TB) PPDU (UL TB PPDU) with block acknowledgements (BAs) 508 from STAs 1 and 2, a trigger frame 510, an uplink multiuser PPDU (UL MU PPDU) 512 from STAs 1 and 2 (i.e., Aggregated MAC Protocol Data Units (DA-MPDUs) from STAs 1 and 2), and a multi-block acknowledgement (M-BA) frame 514 to STAs 1 and 2. In this example, an AP's request for STA 2 to switch to the subchannel 2 (i.e., 80 MHz channel 2) is made in the MU-RTS frame 502 to STA 2. Thus, STA 2 switches to the subchannel 2. Then, after the M-BA frame 514 to STAs 1 and 2, STA 2 switches to the subchannel 1 (i.e., primary 80 MHz channel).

In some embodiments, the multi-link communications system 100 is configured to enable frame exchanges under dynamic channel switch through the soliciting control frame of a TXOP. In a first embodiment, after a STA switches to a new subchannel of a BSS operating channel per AP's request within a TXOP period, the STA parks in the new subchannel for the frame exchanges until one of the following two conditions are satisfied. The first condition is satisfied if after a successful frame exchange where the frame exchange includes a soliciting PPDU and a responding PPDU where the soliciting PPDU carries the frame(s) that requests an immediate response frame or the TXOP holder's PPDU if the PPDU carries the frame(s) that does not solicit a response, the STA does not receive PHY- RXSTART.indication or does not detect the frame addressed to it after receiving PHY-RXSTART.indication within aSIF-STime+aSlotTime+aRxPHYStartDelay. The time period starts at the ending of the last PPDU of the previous frame exchange. The frame is addressed to the STA when one of the following happens:

(a) the receiver address (RA) of the frame is the STA's MAC address;

(b) the frame is a group-addressed frame;

(c) the Null Data Packet (NDP) frame follows a Null Data Packet Announcement (NDPA) with a STA Info field addressed to the STA (AID11 field has STA's Association Identifier (AID));

(d) the trigger frame has the User Info field addressed to the STA (AID12 field has STA's AID);

(e) the NDPA has the STA Info field addressed to the STA (AID11 field has STA's AID); and (f) CTS-to-Self from the AP.

The second condition is satisfied if after receiving a frame addressed to the STA that solicits a response, the STA cannot transmit the response.

Figure 5A:
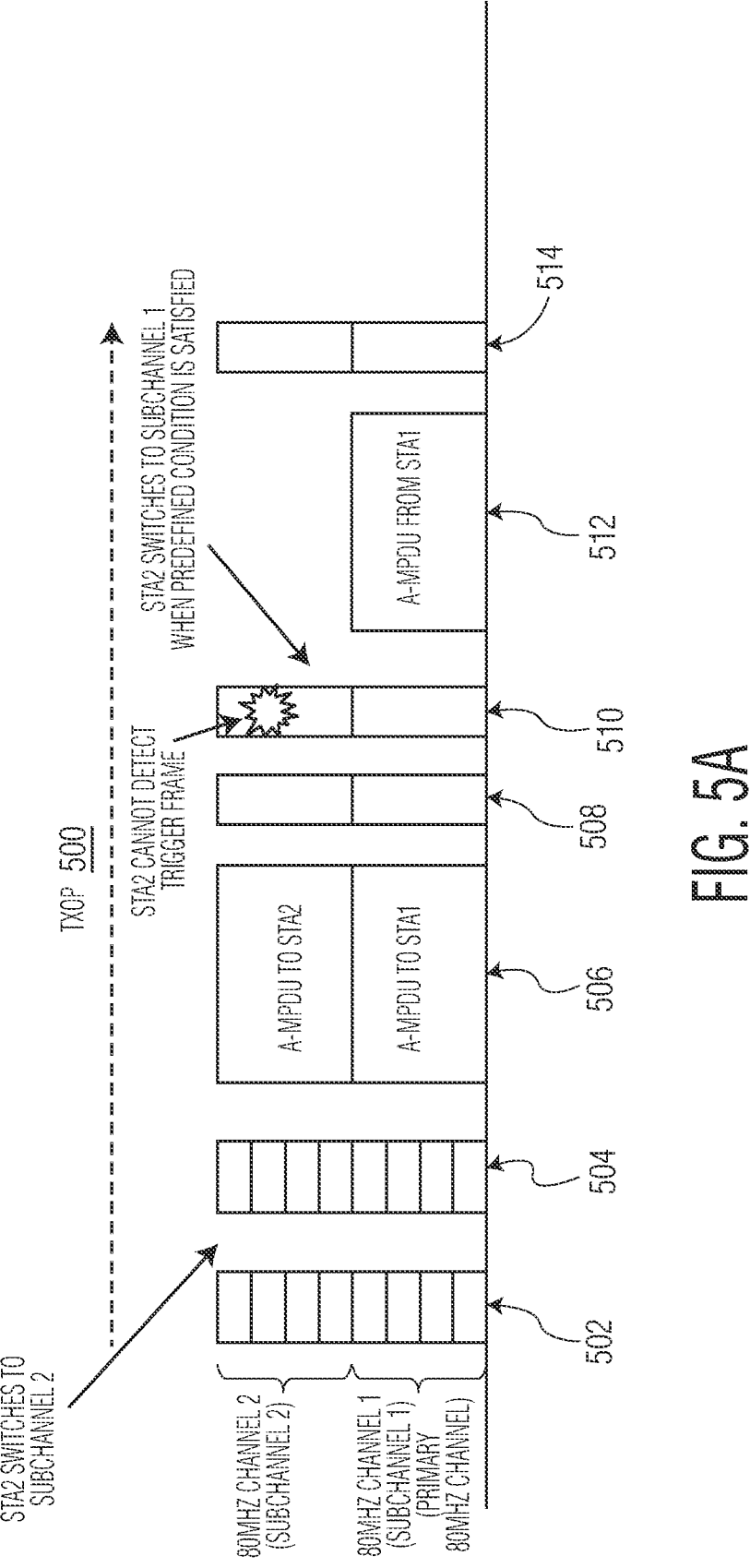
FIGS. 5A and 5B illustrate frame exchanges under dynamic channel switch process when a trigger frame is not detected at a new subchannel in accordance with embodiments of the invention.

This first embodiment is illustrated in FIG. 5A using the example shown in FIG. 4. As illustrated in FIG. 5A, STA 2 cannot detect the trigger frame 510. In this embodiment, STA 2 switches to the subchannel 1 when one of the conditions described above is satisfied.

Figure 5B:
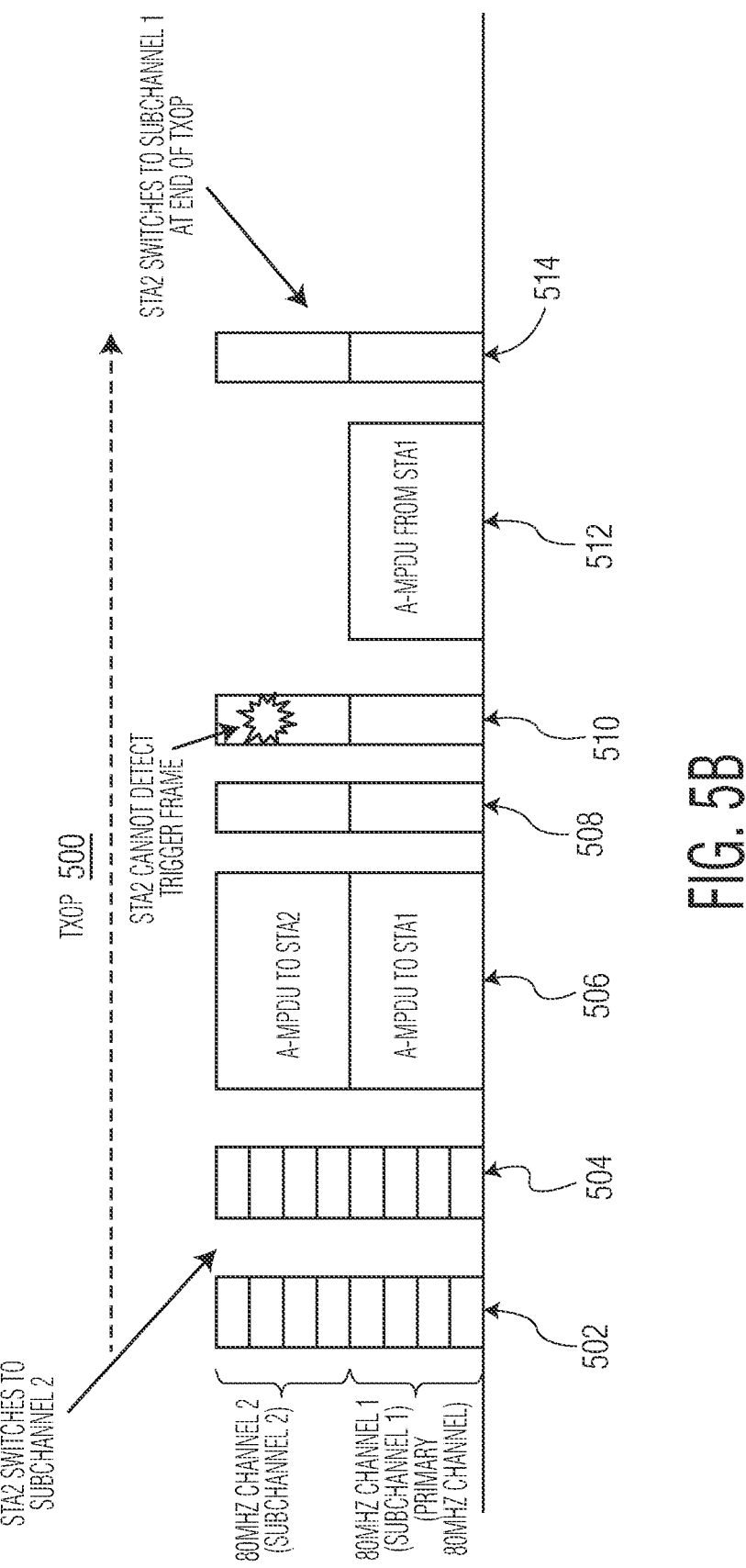

In a second embodiment, after a STA switches to a new subchannel per AP's request within a TXOP period, the STA parks in the new subchannel for the frame exchanges until the end of the TXOP period. This second embodiment is illustrated in FIG. 5B using the example shown in FIG. 4. As illustrated in FIG. STA 2 cannot detect the trigger frame 510. In this embodiment, STA 2 switches to subchannel 1 at the end of the TXOP period after the DL M-BA frame 514 to STA 1.

In some embodiments of secondary channel access, the multi-link communications system 100 is configured to enable the channel switch from one subchannel to another subchannel in a link when the primary subchannel is busy because of the neighbor BSS's TXOP. The STA/AP in the link do the frame exchanges in another secondary subchannel (the subchannel that does not include the primary 20 MHz channel) after the backoff in the secondary 20 MHz channel. In an embodiment, the STA/AP in the link switch back to the primary 20 MHz channel at the end of the neighbor BSS's TXOP.

In an embodiment, the multi-link communications system 100 is configured to manage medium synchronization under secondary channel access. With secondary channel access being used, for some scenarios, both AP and the associated STAs may lose medium synchronization in a subchannel. In this case, a 80 MHz TXOP period in a 80 MHz subchannel (subchannel 1) as an example does not cover another 80 MHz subchannel (subchannel 2) from the beginning until the end of the TXOP period, both the TXOP holder and the TXOP responder(s) lose the medium synchronization in the subchannel 2 since both sides transmits PPDUs that are longer than the predefined threshold of losing medium synchronization. After a STA/AP transmits or receives a PPDU that is longer than the predefined threshold of losing medium synchronization in the subchannel 1, the STA/AP starts the medium synchronization timer if the STA/AP cannot listen on the subchannel 2 when transmitting/receiving the PPDU. If the started timer for medium synchronization does not end at the end of the TXOP period, the STA/AP loses the medium synchronization of the subchannel 2 at the end of the TXOP.

With secondary channel access being used, for some scenarios, one side of AP and the associated STAs may lose the medium synchronization in a subchannel of a BSS operating channel. In this case, a 80 MHz TXOP period in a subchannel (subchannel 1) as an example does not cover another subchannel (subchannel 2) from the beginning until the end of the TXOP period, the TXOP holder loses the medium synchronization in the subchannel 2 since it transmits PPDUs that are longer than the predefined threshold of losing medium synchronization. After the TXOP holder transmits a PPDU in the subchannel 1 that is longer than the predefined threshold of losing medium synchronization, the TXOP holder starts the medium synchronization timer. If the started timer for medium synchronization does not end at the end of the TXOP period, the STA/AP loses the medium synchronization of the subchannel 2 at the end of the TXOP. The TXOP responder keeps the medium synchronization in the subchannel since it transmits PPDUs that are shorter than the predefined threshold of losing medium synchronization and it can do the listening on the subchannel 2 when receiving a PPDU on the subchannel 1.

If a STA loses the medium synchronization in a subchannel (subchannel 2) while the STA is doing frame exchanges with the AP in another subchannel (subchannel 1) and the AP does not lose the medium synchronization in the subchannel 2, the STA can perform one of two (2) options. In the first option, the STA starts the medium synchronization delay timer each time the STA loses the medium synchronization. The initial value being set for the medium synchronization delay timer may be a default value unless the AP announces a different value. As an example, the default value may be 5.404 nanoseconds (ns). The smaller value for the initial value may be defined in the specification. However, if a PPDU is received on the subchannel 2, the medium synchronization delay timer is set to 0. If at the end of the TXOP period, the medium synchronization delay timer has a non-zero value, the STA can use mediumSyncED level (e.g. −72 dbm) to perform Clear Channel Assessment (CCA) and backoff on the subchannel 2. The mediumSyncED has a default value unless the AP announces a different value. In addition, if the backoff counter becomes 0, the STA can transmit an RTS/MU-RTS frame to solicit a CTS frame on the subchannel 2. The transmission of an RTS/MU-RTS frame on the subchannel 2 before the medium synchronization delay timer becomes 0 cannot be more than a threshold with the default value unless the AP announces a different value. If the medium synchronization delay timer become 0 on the subchannel 2, the backoff by using −82 dbm on the subchannel 2 can be done.

In the second option, the STA performs the backoff procedure in the same manner as the normal backoff procedure, i.e., doing the CCA by using −82 dbm CCA level for PPDU detection.

Figure 6A:
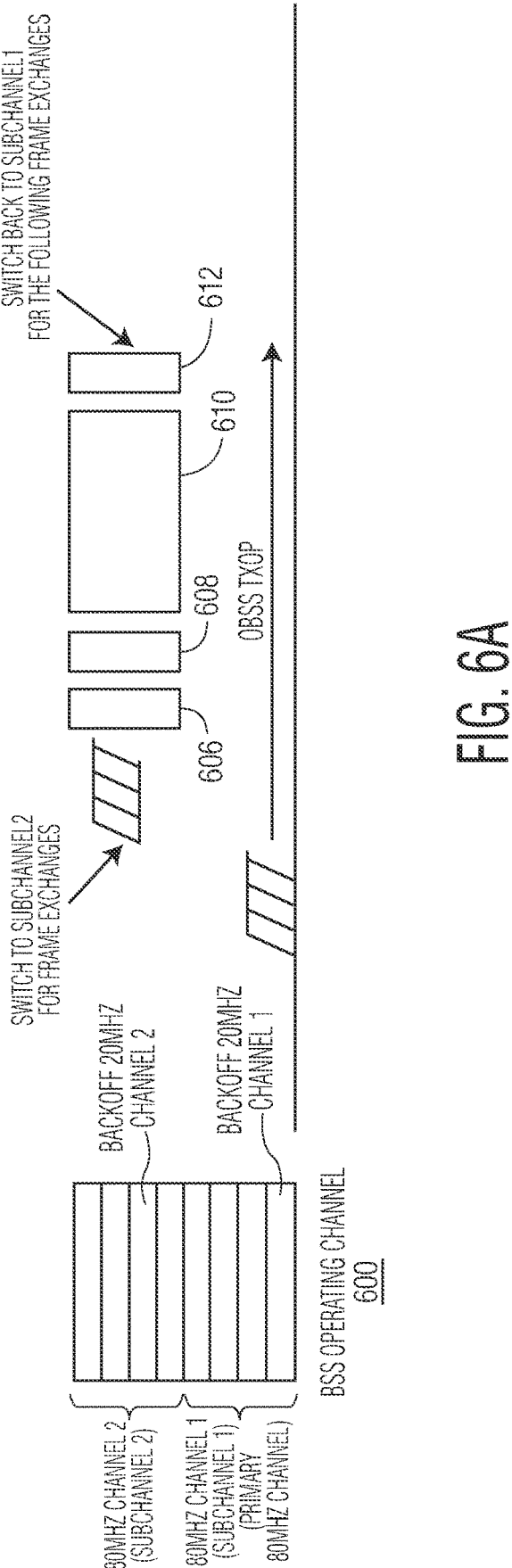
FIGS. 6A and 6B illustrate medium synchronization under secondary channel access in accordance with an embodiment of the invention.
Figure 6B:
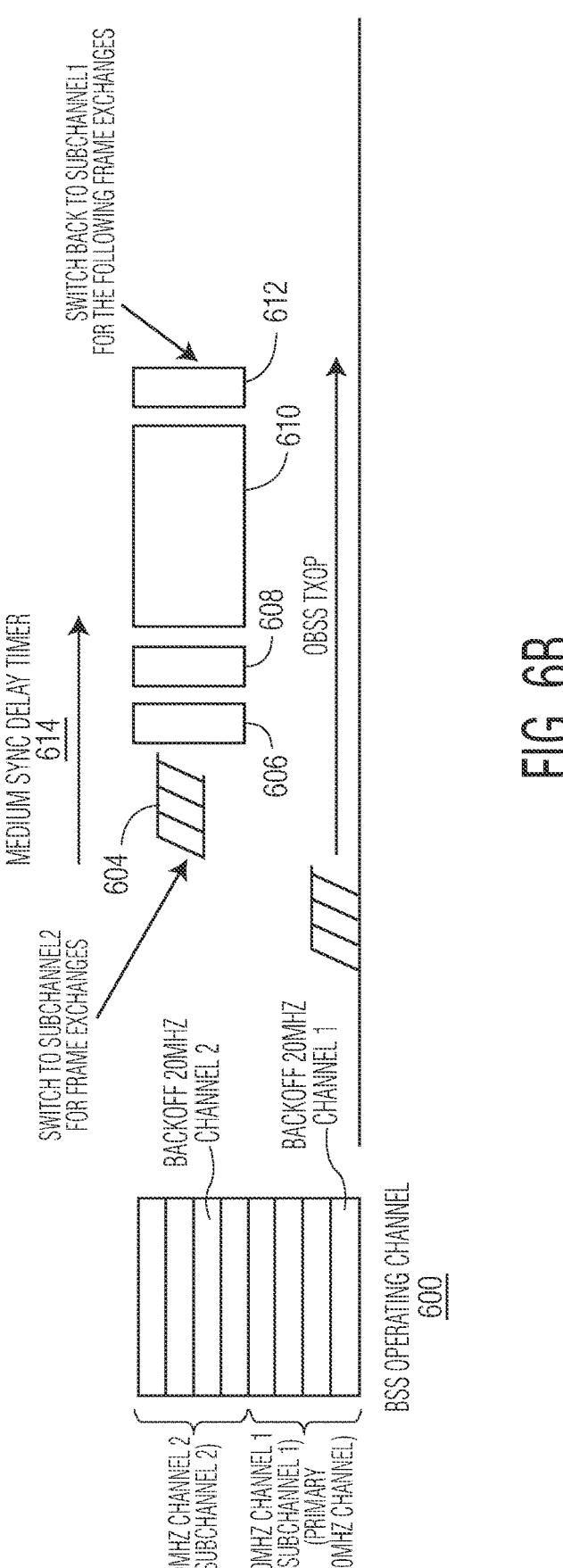

This process of managing medium synchronization under secondary channel access in accordance with an embodiment of the invention is illustrated in FIGS. 6A and 6B using an example. In this example, a BSS operating channel 600 includes subchannels 1 and 2, where each subchannel includes one (1) backoff channel and three (3) other 20 MHz channels. As illustrated in FIG. 6A, when subchannel 1 is used for TXOP of a OBSS (neighbor BSS), the STA and AP try to use subchannel 2 for frame exchanges. On subchannel 1, when the STA or AP does a backoff, an overlapping BSS (OBSS) starts a TXOP. The AP and the STA switch to subchannel 2 for the possible frame exchanges on subchannel 2. On subchannel 2, the STA that loses the medium synchronization on subchannel 2 does the backoff per −82 dbm for PPDU detection. The STA transmits an RTS frame 606 after its backoff counter becomes 0. The AP responds with a CTS frame 608 after the AP receives the RTS. The STA transmits a data frame 610 after receiving the CTS. The AP responds with an acknowledgement (ACK) frame 612 after receiving the data frame.

FIG. 6B illustrates the start of a medium synchronization delay timer 614 by a STA when the STA loses the medium synchronization in the subchannel 2 and the AP does not lose the medium synchronization in the subchannel. In this example, the medium synchronization delay timer 614 is started before the backoff period 604 (e.g., at the end of subchannel 1's TXOP of the BSS not shown in the figure). When subchannel 1 is used for TXOP of a OBSS (neighbor BSS), the STA and AP try to use subchannel 2 for frame exchanges. On subchannel 1, when the STA or AP does a backoff, an overlapping BSS (OBSS) starts a TXOP. The AP and the STA switch to subchannel 2 for the possible frame exchanges on subchannel 2. On subchannel 2, the STA that loses the medium synchronization on subchannel 2 does the backoff per mediumSyncED for energy detection before medium sync delay timer 614 become 0. The STA transmits an RTS frame 606 after its backoff counter becomes 0. The AP responds with a CTS frame 608 after the AP receives the RTS. The STA transmits a data frame 610 after receiving the CTS. The AP responds with an acknowledgement (ACK) frame 612 after receiving the data frame.

If both a STA loses the medium synchronization in a subchannel and the AP loses the medium synchronization in the subchannel, the STA can do one of three (3) options. In the first option, the STA starts the medium synchronization delay timer of a subchannel each time the STA loses the medium synchronization in the subchannel (subchannel 2 as an example) because of the frame exchanges between the AP and the STA in another subchannel (subchannel 1 as an example). If a PPDU is received correctly at subchannel 2, the medium synchronization delay timer is set to 0. The STA can perform the normal backoff when the medium synchronization delay timer has a value of 0. Otherwise, the second option is performed.

In the second option, the STA does whatever the STA does in the first option when the STA loses the medium synchronization in a subchannel (subchannel 2) while the STA is doing frame exchanges with the AP in another subchannel (subchannel 1) and the AP does not lose the medium synchronization in subchannel 2.

In the third option, the STAT performs the backoff procedure in the same manner as the normal backoff procedure.

If an AP loses the medium synchronization in a subchannel (subchannel 2) while the AP is doing frame exchanges with at least one STA in another subchannel (subchannel 1) and at least one STA does not lose the medium synchronization in the subchannel 2, the AP can perform one of two (2) options. In the first option, the AP starts the medium synchronization delay timer each time the AP loses the medium synchronization. The initial value being set to medium synchronization delay timer may be the default value unless the AP selects a different value. The smaller value for the initial value may be defined in the specification. If a PPDU is received on subchannel 2, the medium synchronization timer is set to 0. If at the end of the TXOP period, the medium synchronization delay timer has a non-zero value, the AP can use mediumSyncED level (e.g., −72 dbm) to do the CCA and backoff on subchannel 2. The mediumSyncED has a default value unless the AP selects a different value. The minimum value for the different value may be defined in the specification. In addition, if the backoff counter becomes 0, the STA can transmit an RTS/MU-RTS frame to solicit a CTS frame from the STA that does not lose the medium synchronization in the subchannel. The transmission of an RTS/MU-RTS frame on subchannel 2 before the medium synchronization timer becomes 0 cannot be more than a threshold with the default value unless the AP selects a different value. The smaller value for the different value may be defined in the specification. If the medium synchronization delay timer become 0 on subchannel 2, the backoff by using −82 dbm on subchannel 2 can be done.

In the second option, the AP performs the backoff procedure in the same manner as the normal backoff procedure, i.e., doing the CCA by using −82 dbm CCA level for PPDU detection.

If an AP loses the medium synchronization in a subchannel and there is no STA that has the medium synchronization in the subchannel at the end of the TXOP period, the AP can perform one of three (3) options. In the first option, the AP starts the medium synchronization delay timer of a subchannel each time the AP loses the medium synchronization in the subchannel (subchannel 2 as an example) because of the frame exchanges between the AP and the STA in another subchannel (subchannel 1 as an example). If a PPDU is received correctly at subchannel 2, the medium synchronization delay timer is set to 0. The AP can perform the normal backoff when the medium synchronization timer has a value of 0. Otherwise, the option 2 is performed.

In the second option, the AP does whatever the AP does in the first option when the AP loses the medium synchronization in a subchannel (subchannel 2) while the AP is doing frame exchanges with the STA in another subchannel (subchannel 1) and the STA does not lose the medium synchronization in subchannel 2.

In the third option, the AP performs the backoff procedure in the same manner as the normal backoff procedure.

In an embodiment, the multi-link communications system 100 is configured to handle internal backoff collision. If an AP/STA does the backoff in multiple backoff 20 MHz channels and the backoff counters in multiple 20 MHz backoff channels become 0 at the same time, the AP/STA selects one such backoff counter in a 20 MHz backoff channel to decide the TXOP BW for the frame exchanges. The other such backoff counters whose values become 0 at the same time as the selected such backoff counter are treated as internal collision. In this case, the related contention window (CW) may be doubled. The backoff counter selection criteria can be based on access categories (ACs). These ACs may include voice, video, best effort and background (listed in order from highest priority to the lowest priority). In this case, the backoff counter with the highest priority AC is selected. If multiple backoff counters have the same highest priority AC, any one of them can be selected unless the backoff counter in primary 20 MHz channel is one of them in which case the backoff counter in primary 20 MHz channel is selected. Alternatively, the backoff counter selection criteria can be based on the primary 20 MHz channel as the highest priority. If the backoff counter in the primary 20 MHz channel becomes 0 at the same time as the backoff counter(s) of the other 20 MHz backoff channel(s), the backoff counter in the primary 20 MHz channel is selected. Otherwise, a backoff counter is selected per AC priority related to the backoff counter.

In some embodiments, the multi-link communications system 100 is configured to handle TXOP BW decisions. In a first embodiment, when the backoff counter in one backoff 20 MHz channel (e.g., backoff 20 MHz channel 1) becomes 0, a secondary 20 MHz channel can be part of the TXOP BW, if within a priority interframe space (PIFS) period before the first PPDU transmission of the TXOP, the secondary 20 MHz channel is idle. The secondary 20 MHz channel can be further restricted in certain situations. When dynamic puncture is not allowed, the TXOP BW may be selected using the following steps:

(1) If the 20 MHz channels that are not punctured by static channel puncture in 320 MHz channel other than the backoff 20 MHz channel are idle within the PIFS period before the first PPDU transmission of the TXOP, the TXOP BW is 320 MHz. Otherwise, go to step (2).

(2) If the 20 MHz channels that are not punctured by static channel puncture in 160 MHz channel other than the backoff 20 MHz channel are idle within the PIFS period before the first PPDU transmission of the TXOP, the TXOP BW is 160 MHz. Otherwise, go to step (3).

(3) If the 20 MHz channels that are not punctured by static channel puncture in 80 MHz channel other than the backoff 20 MHz channel are idle within the PIFS period before the first PPDU transmission of the TXOP, the TXOP BW is 80 MHz. Otherwise, go to step (4).

(4) If the 20 MHz channels that are not punctured by static channel puncture in 40 MHz channel other than the backoff 20 MHz channel are idle within the PIFS period before the first PPDU transmission of the TXOP, the TXOP BW is 40 MHz.

In a second embodiment, in addition to the requirements of the first embodiment, for a 20 MHz channel that is a backoff 20 MHz channel (the primary channel is a specific backoff 20 MHz channel) other than backoff 20 MHz channel 1, the virtual carrier sensing (i.e., RTS/CTS handshake) is considered also for deciding whether the 20 MHz channel is idle.

Figure 7:
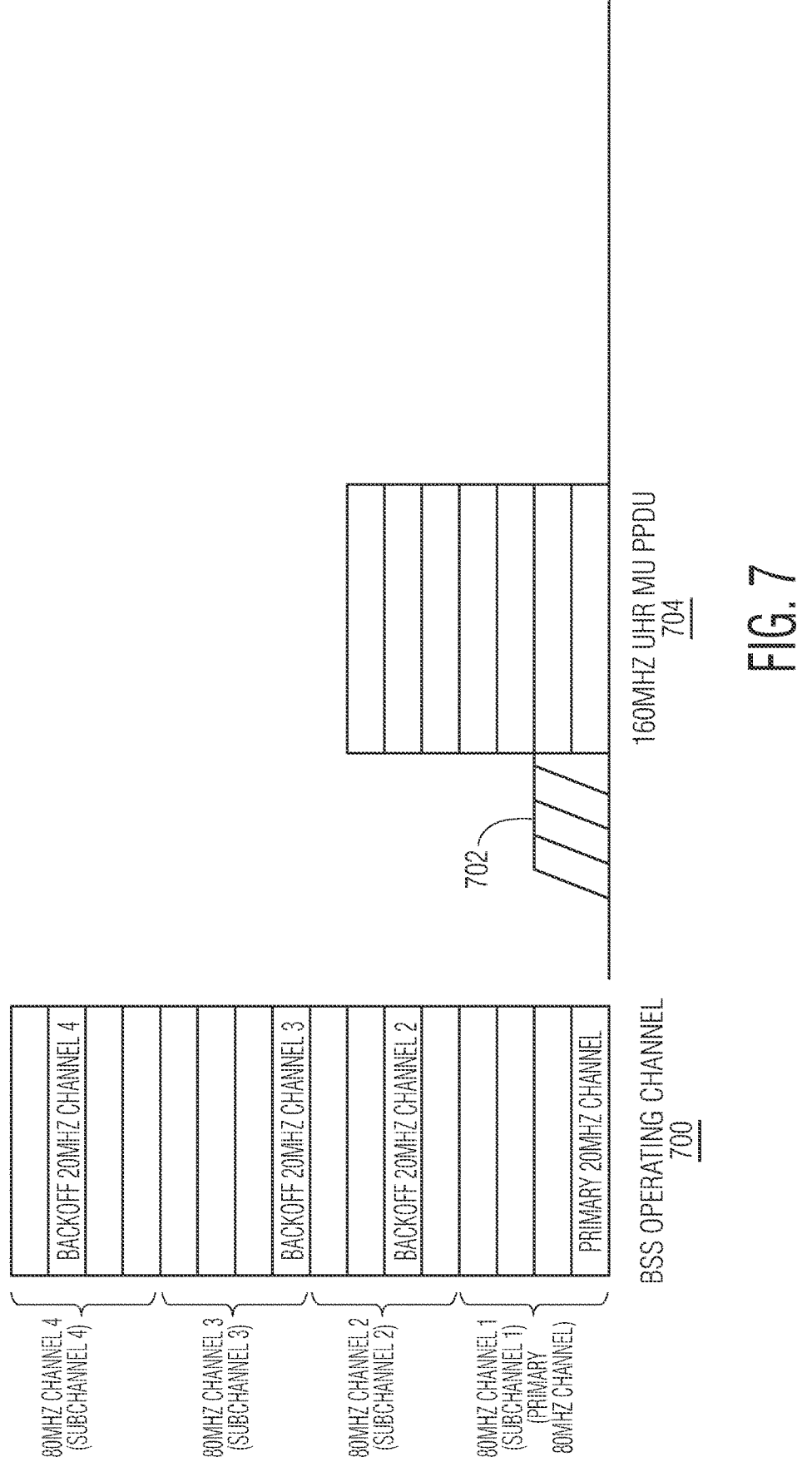
FIG. 7 illustrates a process of making TXOP bandwidth (BW) decision in accordance with an embodiment of the invention.

The process of making TXOP BW decision in accordance with an embodiment of the invention is illustrated in FIG. 7 using an example. In this example, a BSS operating channel 700 that is same as the BSS operating channel 200 shown in FIG. 2 is used. In FIG. 7, a backoff period 702 and a 160 MHz Ultra High Reliability (UHR) MU PPDU 704 are shown. In this example, the PHY CCA within the PIFS period in the backoff period 702 before the PPDU 704 is busy and the Network Allocation Vector (NAV) timer of the backoff 20 MHz channel 3 is not 0. The 20 MHz channels in subchannel 1 and subchannel 2 other than the primary 20 MHz channels are idle PIFS before transmitting the UHR MU PPDU 704. Thus, an AP selects PPDU transmission without channel puncture for TXOP BW of 160 MHz (subchannels 1 and 2).

In some embodiments, the multi-link communications system 100 is configured to enable Resource Unit (RU) coding. In a first embodiment, the RU index of an RU is the RU index per the BSS BW. For example, in a 320 MHz BSS, a RU in a TXOP BW of secondary 160 MHz is coded as if the RU is in 320 MHz BW DL/UL MU/TB PPDU. As another example, in a 320 MHz BSS, a RU in an 80 MHz BW of secondary 160 MHz is coded as if the RU is in related BW of 320 MHz BW DL/UL MU/TB PPDU.

In a second embodiment, the RU index of an RU is the RU index per the TXOP BW. When the TXOP BW that does not cover the primary 20 MHz channel is not wider than a subchannel, the backoff 20 MHz channel is treated as the primary 20 MHz channel for RU index coding. When the TXOP BW is wider than a subchannel, the RU index coding is based on one of the backoff 20 MHz channel being treated as the primary 20 MHz channel for RU index coding announced by the AP through a management frame. For example, in a 320 MHz BSS, an RU in a TXOP BW of secondary 160 MHz is coded as if the RU is in 160 MHz BW DL/UL MU/TB PPDU. In this example, the AP will announce an RU index primary 20 MHz channel that is one of the backoff 20 MHz channels of secondary 160 MHz channel for RU index definition. In one embodiment, the AP announces the RU index primary 20 MHz channel for various subchannel combinations in a Beacon frame, and the STAs use such announcement to figure out the RU index of various RUs. As another example, in a 320 MHz BSS, an RU in a TXOP BW of any nonprimary 80 MHz is coded as if the RU is in 80 MHz BW DL/UL MU/TB PPDU. In this example, the AP will use the backoff 20 MHz channel of the 80 MHz subchannel as an RU index primary 20 MHz for RU index definition.

Figure 8:
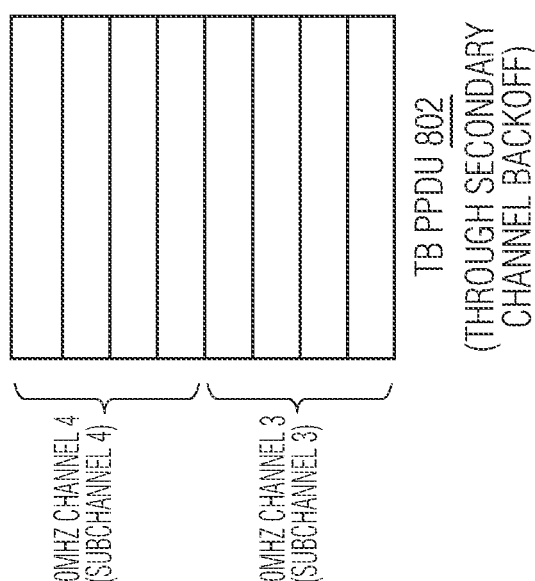
FIG. 8 illustrates a process of Resource Unit (RU) coding in accordance with an embodiment of the invention.
Figure 8:
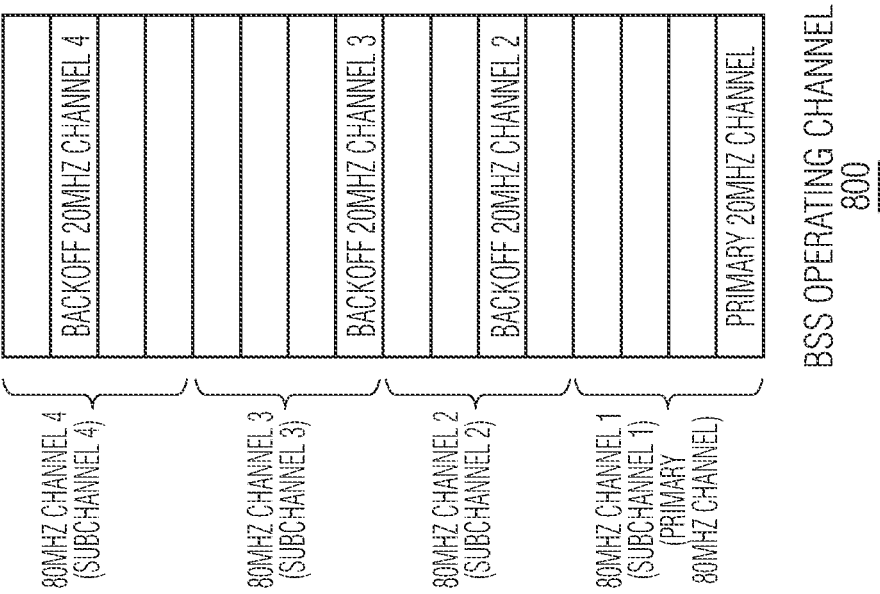

The process of RU coding in accordance with an embodiment of the invention is illustrated in FIG. 8 using an example. In this example, a BSS operating channel 800 that is same as the BSS operating channel 200 shown in FIG. 2 is used. In FIG. 8, a TB PPDU 802 through secondary channel backoff is shown. The issue that needs to be addressed in this example is that, for subchannel 3, B0 of the RU allocation field is equal to 1 if RU index coding assumes that the primary 20 MHz channel is in subchannel 4. However, B0 of the RU allocation field is equal to 0 if RU index coding assumes that the primary channel is in subchannel 3. For subchannel 4, B0 of the RU allocation field is equal to 0 if RU index coding assumes that the primary 20 MHz channel is in subchannel 4. However, B0 of the RU allocation field is equal to 1 if RU index coding assumes that the primary 20 MHz channel is in subchannel 3.

In this example, in order to address the issue, the AP will announce one of subchannel 3's backoff 20 MHz channel and subchannel 4's backoff channel will be RU index primary 20 MHz for RU index definition for the RU index coding.

In some embodiments, the multi-link communications system 100 is configured to update Enhanced Distribution Channel Access (EDCA) parameters. In a first embodiment, when a TXOP BW covers multiple 20 MHz backoff channels, the EDCA parameters of the 20 MHz backoff channel whose backoff counter being 0 initiates the TXOP period are updated. In a second embodiment, when a TXOP BW covers multiple 20 MHz backoff channels, the EDCA parameters of all the covered 20 MHz backoff channels whose Association Identifier (AID) are same as the AID of the backoff counter that initiates the TXOP period are updated.

Figure 9:
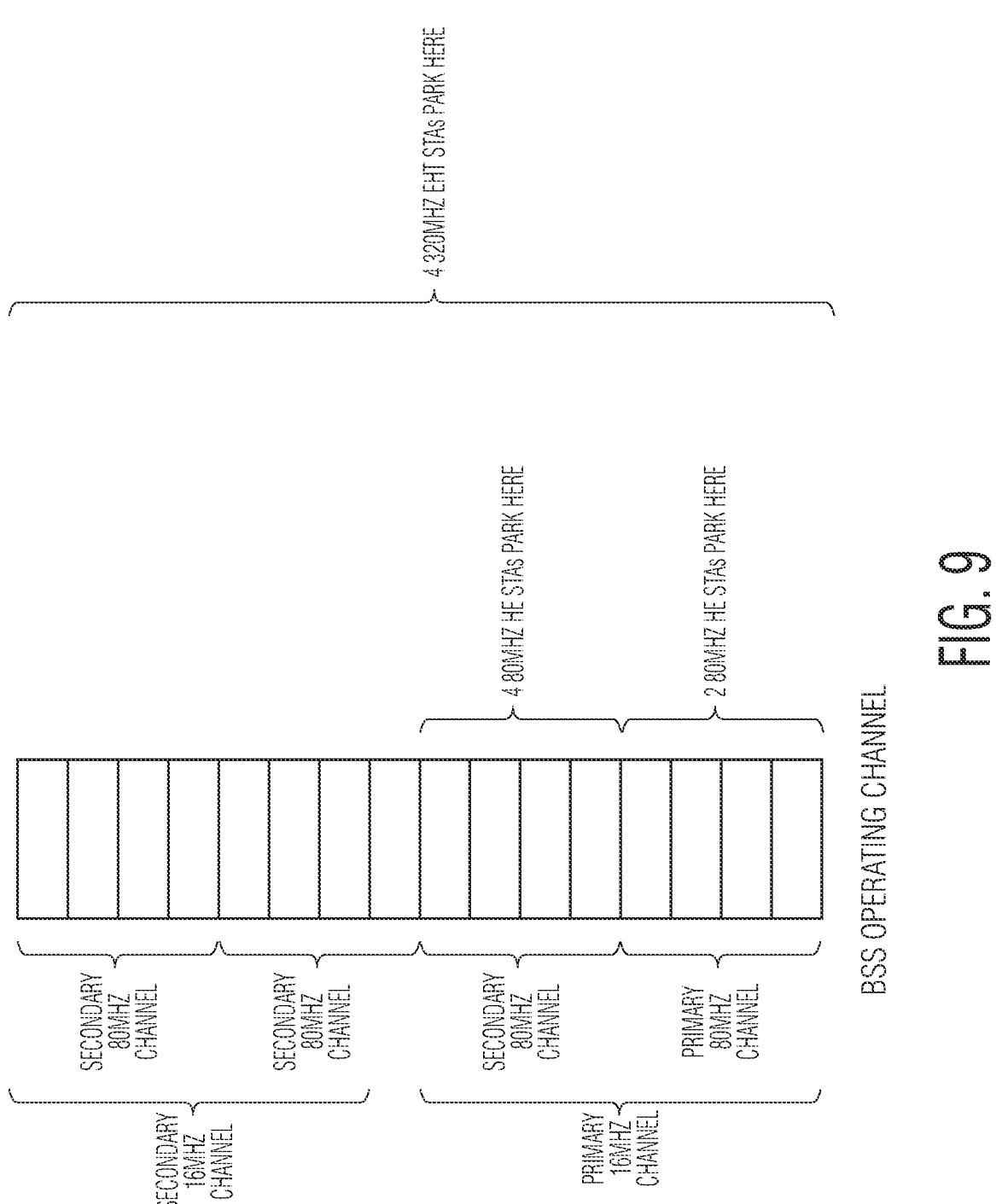
FIG. 9 shows an example of a Basic Service Set (BSS) operating channel in accordance with an embodiment of the invention.

As noted above, a BSS operating channel can be separated into multiple channels with narrower width. An example of a BSS operating channel 900 in accordance with an embodiment of the invention is illustrated in FIG. 9. In this example, the BSS operating channel 900 is a 320 MHz BSS channel, which is separated into sixteen (16) 20 MHz channels, four (4) 80 MHz channels, two (2) 160 MHz channels, or channels with different widths. An 80 MHz STA can be allocated to an 80 MHz channel other than the primary 80 MHz channel in a TWT SP through a TWT SST operation. A 160 MHz STA can be allocated to 160 MHz channel other than the primary 160 MHz channel in a TWT SP through a TWT SST operation.

Figure 10:
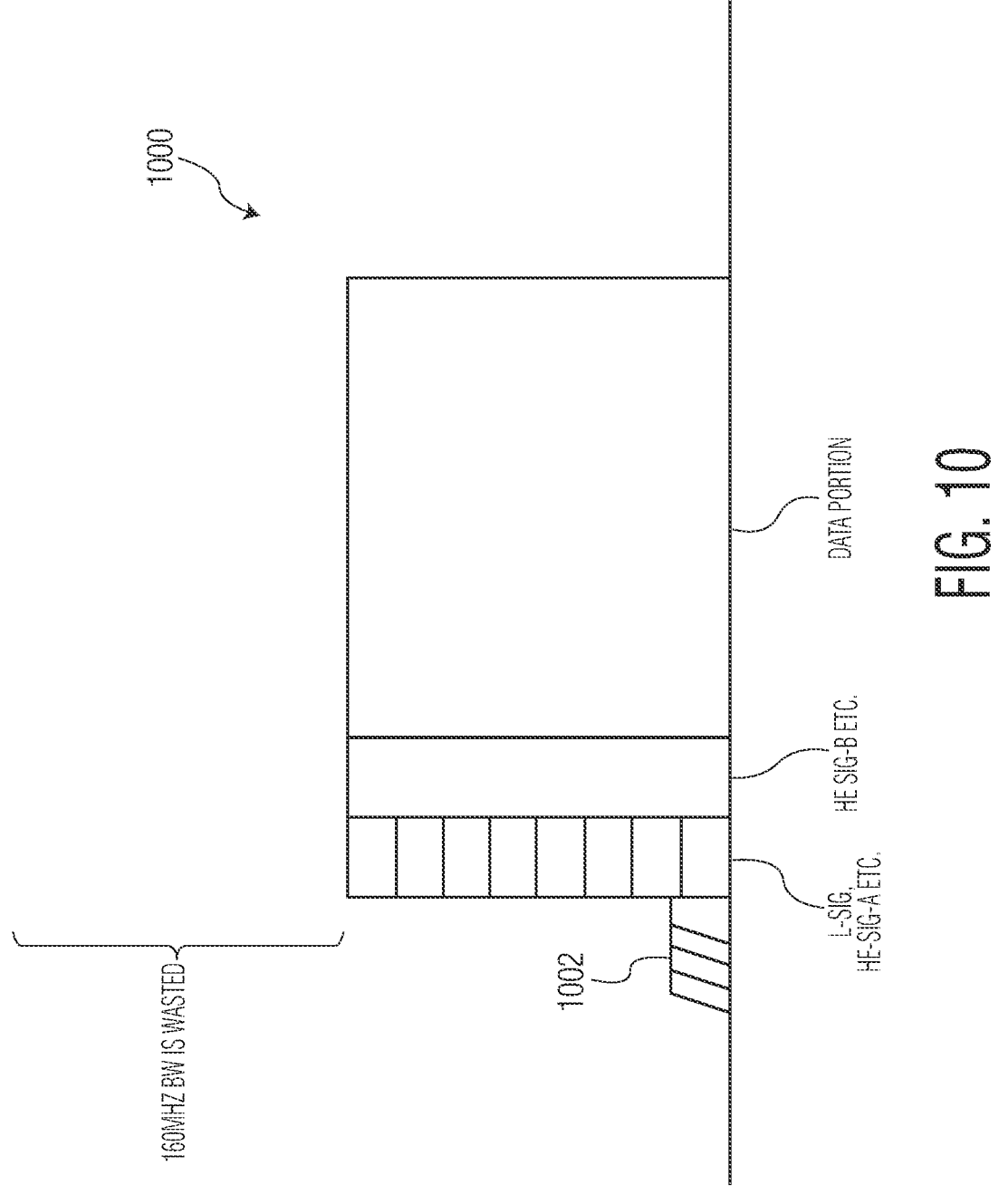
FIG. 10 shows an example of frames of a High Efficiency (HE) multi-user (MU) Physical Layer Protocol Data Unit (PPDU) that is addressed to HE stations (STAs) in accordance with an embodiment of the invention.

However, if the frames in a High Efficiency (HE) MU PPDU are addressed to the HE STAs, the secondary 160 MHz channel cannot be used since the High Efficiency Signal (HE SIG) is transmitted in the primary 20 MHz channel. An example of frames of an HE MU PPDU 1000 that is addressed to HE STAs in accordance with an embodiment of the invention is illustrated in FIG. 10. In this example, backoff and CCA executed during a backoff period 1002 detect 320 MHz channel idle. Thus, frames of the HE MU PPDU 1000, which may include Legacy Signal Field (L-SIG), HE-SIG-A, HE-SIG-B etc., as well as a data portion, are addressed to HE STAs. As illustrated, in this scenario, the secondary 160 MHz BW is wasted.

In an embodiment, the multi-link communications system 100 is configured to enable enhanced channel parking through SST. In 320 MHz BSS, a 320 MHz STA can park in secondary 160 MHz channel in a TWT SP through a TWT SST negotiation. With this method, the 320 MHz STAs parked in secondary 160 MHz channel (subchannel) cannot use the primary 160 MHz channel.

Figure 11:
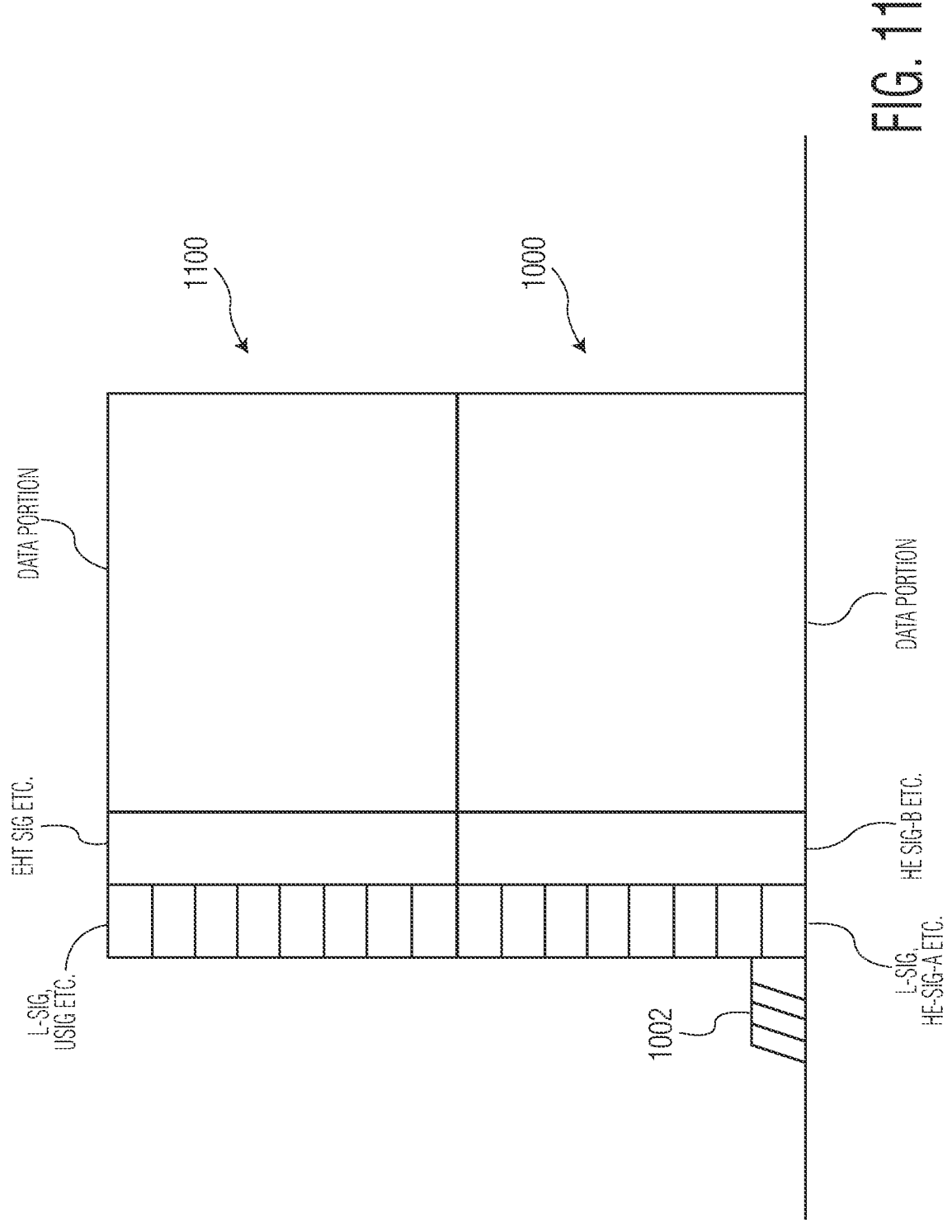
FIG. 11 illustrates a method of using enhanced channel parking through selective subchannel transmission (SST) in accordance with an embodiment of the invention.

This method of using enhanced channel parking through SST in accordance with an embodiment of the invention is illustrated in FIG. 11. As shown in FIG. 11, a 320 MHz STA is now parked in the secondary 160 MHZ channel, which was previously wasted, as illustrated in FIG. 10. In this example, the secondary 160 MHZ channel is used to transmit frames of an EHT PPDU 1100, which include L-SIG, USING, EHT SIG etc., as well as a data portion.

Similarly, in 160 MHz BSS, a 160 MHz STA can park in secondary channel (subchannel) in a TWT SP through a TWT SST negotiation. With this method, the 160 MHz STAs parked in secondary 80 MHz channel cannot use the primary 80 MHz channel. Generally, a STA whose BW is same as the BSS operating channel BW can park in a subchannel that does not include primary 20 MHz channel (e.g., through a TWT SST negotiation).

In 320 MHz BSS, a 320 MHz STA can park in 320 MHz channel and decode the USIG and HE SIG-A in secondary 160 MHz channel in a TWT SP through an enhanced TWT SST negotiation. One 20 MHz channel of secondary 160 MHz channel is the dummy primary 20 MHz channel which is not to be punctured and used for decoding USIG and HE SIG-A.

Figure 12A:
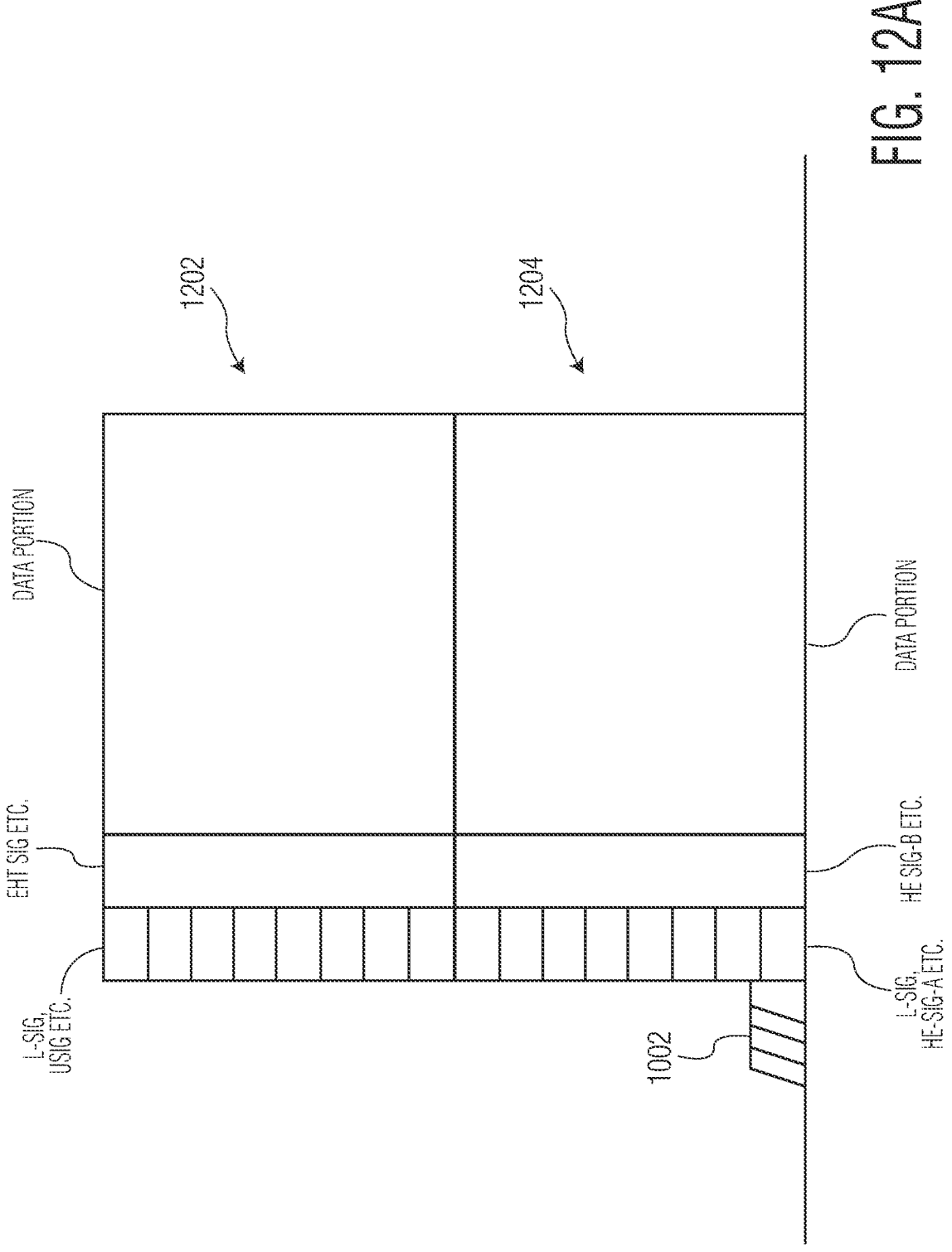
FIGS. 12A and 12B illustrate a method of using enhanced SST in accordance with an embodiment of the invention.
Figure 12B:
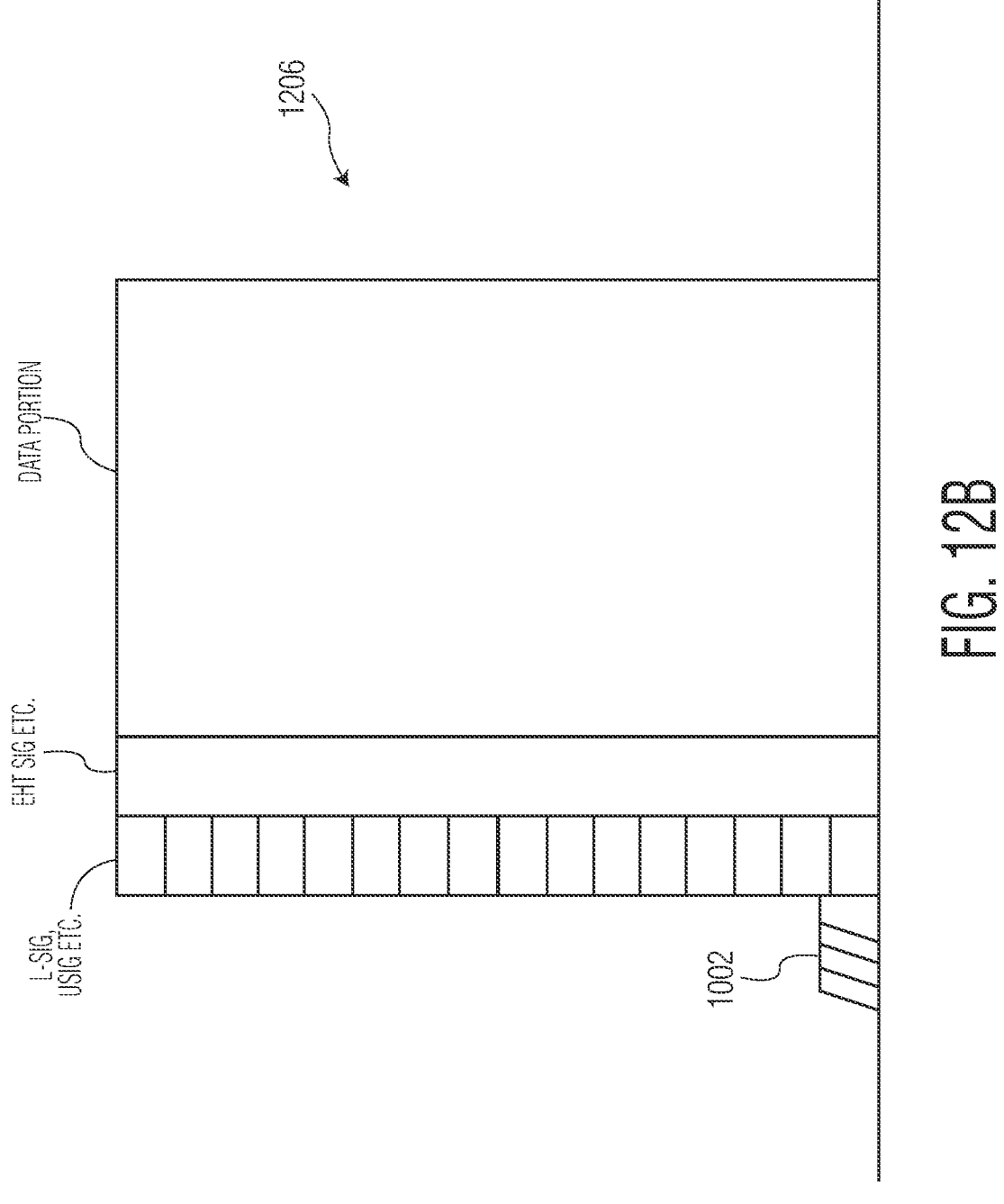

This method of using enhanced SST in accordance with an embodiment of the invention is illustrated in FIGS. 12A and 12B. As shown in FIG. 12A, a 320 MHz STA can park in the 320 MHZ channel. In this example, the secondary 160 MHz channel is used to transmit frames of a EHT PPDU 1202, while the primary 160 MHz channel is used to transmit frames of a HE MU PPDU 1204. As shown in FIG. 12B, a 320 MHz STA can park in the 320 MHZ channel. In this example, both the primary and secondary 160 MHz channels are used to transmit frames of a EHT PPDU 1206.

Similarly, in 160 MHz BSS, a 160 MHz STA can park in 160 MHz channel and decode the USIG and HE SIG-A in secondary 80 MHz channel in a TWT SP through an enhanced TWT SST negotiation. One 20 MHz channel of secondary 80 MHz channel is the dummy primary 20 MHz channel, which is not punctured and used for decoding USIG and HE SIG-A. Generally, a STA whose BW is same as the BSS operating channel BW can decode USG and HE SIG-A in a subchannel that does not include the primary 20 MHz channel (e.g., through an enhanced TWT SST negotiation).

A method for performing frame exchanges in a link between multi-link devices in accordance with an embodiment of the invention is described with reference to a flow diagram of FIG. 13. At step 1302, multiple subchannels of a Basic Service Set (BSS) operating channel are announced by a first multi-link device for the link. Each of the multiple subchannels includes a single backoff channel and at least another channel. At step 1304, a secondary parking subchannel among the multiple subchannels of the BSS operating channel in the link between the first multi-link device and a second multi-link device. At step 1306, frames are exchanged between the first and second multi-link devices using the secondary parking subchannel. The frame exchanging includes switching to the secondary parking subchannel from a different subchannel of the BSS operating channel to exchange the frames using the secondary parking subchannel.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner. It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
    a controller configured to:
        announce multiple subchannels of a basic service set (BSS) operating channel, wherein each of the multiple subchannels includes a single backoff channel and at least one another channel;
        negotiate a secondary parking subchannel among the multiple subchannels of the BSS operating channel in a link between the device and another device; and
        exchange frames between the device and the another device using the secondary parking subchannel, including switching to the secondary parking subchannel from a different subchannel of the BSS operating channel to exchange the frames using the secondary parking subchannel;
    wherein the controller is configured to negotiate the secondary parking subchannel among the multiple subchannels of the BSS operating channel in the link between the device and the another device during a broadcast target wake time (TWT) membership negotiation.

2. The device of claim 1,
    wherein the controller is configured to request the another device to switch to a subchannel of the multiple subchannels of the BSS operating channel other than the secondary parking subchannel during a transmission opportunity (TXOP) period.

3. The device of claim 1,
wherein the controller is configured to code a Resource Unit (RU) index of a RU as an RU index per a bandwidth of the BSS operating channel or as an RU index per a bandwidth of a transmission opportunity (TXOP) period.

4. The device of claim 1,
wherein the controller is configured to, when a bandwidth (BW) of a transmission opportunity (TXOP) period covers multiple backoff channels, update Enhanced Distribution Channel Access (EDCA) parameters of a particular backoff channel that initiated the TXOP period or the EDCA parameters of each of the multiple backoff channels with an Association Identifier (AID) that is same as an AID of a particular backoff channel that initiated the TXOP period.

5. A device comprising:
a controller configured to:
   announce multiple subchannels of a basic service set (BSS) operating channel, wherein each of the multiple subchannels includes a single backoff channel and at least one another channel;
   negotiate a secondary parking subchannel among the multiple subchannels of the BSS operating channel in a link between the device and another device; and
   exchange frames between the device and the another device using the secondary parking subchannel, including switching to the secondary parking subchannel from a different subchannel of the BSS operating channel to exchange the frames using the secondary parking subchannel;
wherein the controller is configured to negotiate the secondary parking subchannel among the multiple subchannels of the BSS operating channel in the link between the device and the another device using a beacon transmitted through a duplicate Physical Layer Protocol Data Unit (PPDU), and
wherein at least one of the first and second multi-link devices can perform simultaneous backoff operations in more than one of the multiple subchannels.

6. A device comprising:
a controller configured to:
   announce multiple subchannels of a basic service set (BSS) operating channel, wherein each of the multiple subchannels includes a single backoff channel and at least one another channel;
   negotiate a secondary parking subchannel among the multiple subchannels of the BSS operating channel in a link between the device and another device; and
   exchange frames between the device and the another device using the secondary parking subchannel, including switching to the secondary parking subchannel from a different subchannel of the BSS operating channel to exchange the frames using the secondary parking subchannel;
wherein the controller is configured to manage medium synchronization in a subchannel of the BSS operating channel after the medium synchronization is lost at the end of a transmission opportunity (TXOP) period that does not cover the subchannel from the beginning to the end of the TXOP period.

7. A device comprising:
a controller configured to:
   announce multiple subchannels of a basic service set (BSS) operating channel, wherein each of the multiple subchannels includes a single backoff channel and at least one another channel;
   negotiate a secondary parking subchannel among the multiple subchannels of the BSS operating channel in a link between the device and another device; and
   exchange frames between the device and the another device using the secondary parking subchannel, including switching to the secondary parking subchannel from a different subchannel of the BSS operating channel to exchange the frames using the secondary parking subchannel;
wherein the controller is configured to, when backoff counters in the multiple subchannels become zero at the same time, using a backoff counter with the highest priority access category (AC) to initiate a transmission opportunity (TXOP) period.

8. The device of claim 7,
wherein the backoff counter with the highest priority AC is in the primary channel when more than one backoff counters have the same highest priority AC.

\*    \*    \*    \*    \*